US 007920284B2

(12) United States Patent
Yamada et al.

(10) Patent No.: US 7,920,284 B2
(45) Date of Patent: Apr. 5, 2011

(54) IMAGE-PROVIDING APPARATUS, IMAGE-PRINTING APPARATUS AND IMAGE-PRINTING SYSTEM COMPRISED THEREOF

(75) Inventors: Akitoshi Yamada, Yokohama (JP); Masao Kato, Kawasaki (JP); Akinori Horiuchi, Yokohama (JP); Futoshi Sasaki, Kawasaki (JP); Takashi Gyotoku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 11/675,809

(22) Filed: Feb. 16, 2007

(65) Prior Publication Data
US 2007/0195362 A1 Aug. 23, 2007

(30) Foreign Application Priority Data

Feb. 20, 2006 (JP) ................. 2006-043167

(51) Int. Cl.
*G06F 3/12* (2006.01)
*G06K 15/00* (2006.01)
(52) U.S. Cl. ............... 358/1.15; 358/1.13; 358/1.14
(58) Field of Classification Search ......... 358/1.11–1.18
See application file for complete search history.

(56) References Cited

U.S. PATENT DOCUMENTS

| | | | | |
|---|---|---|---|---|
| 6,995,855 B2* | 2/2006 | Nagasaka | ............... | 358/1.15 |
| 7,463,381 B2* | 12/2008 | Shiohara | ............... | 358/1.15 |
| 7,564,576 B2* | 7/2009 | Kato et al. | ............... | 358/1.15 |
| 7,715,033 B2* | 5/2010 | Mikami et al. | ............... | 358/1.15 |
| 7,764,393 B2* | 7/2010 | Yamada et al. | ............... | 358/1.15 |
| 2003/0067620 A1 | 4/2003 | Masumoto et al. | ......... | 358/1.13 |
| 2003/0156196 A1 | 8/2003 | Kato et al. | ............... | 348/207.2 |
| 2003/0231341 A1 | 12/2003 | Aichi et al. | | |
| 2004/0021901 A1* | 2/2004 | Watanabe | ............... | 358/1.15 |
| 2004/0021902 A1 | 2/2004 | Ogiwara et al. | ............ | 358/1.15 |
| 2004/0046990 A1 | 3/2004 | Yano et al. | ............... | 358/1.15 |
| 2004/0070672 A1 | 4/2004 | Iwami et al. | ............... | 348/207.2 |
| 2004/0160632 A1 | 8/2004 | Kato | ............... | 358/1.15 |
| 2004/0252335 A1 | 12/2004 | Yano et al. | ............... | 358/1.15 |
| 2004/0257605 A1* | 12/2004 | Hayashi | ............... | 358/1.14 |
| 2005/0024497 A1 | 2/2005 | Sakamoto et al. | ........ | 348/207.2 |
| 2005/0088689 A1* | 4/2005 | Suga et al. | ............... | 358/1.15 |

(Continued)

FOREIGN PATENT DOCUMENTS

JP 2004-013349 1/2004

(Continued)

OTHER PUBLICATIONS

Japanese Office Action dated Nov. 19, 2010, in corresponding Japanese Application No. 2006-043167.

*Primary Examiner* — James A Thompson
*Assistant Examiner* — Satwant K Singh
(74) *Attorney, Agent, or Firm* — Fitzpatrick, Cella, Harper & Scinto

(57) ABSTRACT

A procedure that confirms the presence or absence of support for standardized capabilities is present in transmissions to an image-providing apparatus having a photo-direct print capability and an image-printing apparatus, for example. The procedure is used to exchange information relating to the presence or absence of support for a service that provides a cooperative capability separate from the standardized capabilities, making it possible to use non-standard capabilities while maintaining compatibility with devices that do not support the service that provides the cooperative capability separate from the standardized capabilities.

10 Claims, 19 Drawing Sheets

U.S. PATENT DOCUMENTS

| | | | |
|---|---|---|---|
| 2005/0219555 A1 | 10/2005 | Onuma et al. | 358/1.1 |
| 2006/0044395 A1 | 3/2006 | Aichi et al. | 348/207.2 |
| 2006/0072895 A1 | 4/2006 | Yamada et al. | 386/46 |
| 2006/0098938 A1 | 5/2006 | Goto et al. | 386/46 |
| 2007/0133052 A1 | 6/2007 | Yamada et al. | 358/1.15 |
| 2007/0195362 A1 | 8/2007 | Yamada et al. | 358/1.15 |

FOREIGN PATENT DOCUMENTS

JP  3530847  3/2004

\* cited by examiner

FIG. 7

```
SC701 ── <startJob>
SC702 ──   <jobConfig>
SC703 ──     <quality>
               normal
             </quality>
SC704 ──     <paperSize>
               L
             </paperSize>
SC705 ──     <paperType>
               Photo
             </paperType>
SC706 ──     <fileType>
               Jpeg
             </fileType>
SC707 ──     <datePrint>
               On
             </datePrint>
SC708 ──     <imageOptimize>
               PrinterDependent
             </imageOptimize>
SC709 ──     <cropping>
               Off
             </cropping>
           </jobConfig>
SC710 ──   <printInfo>
SC711 ──     <fileID>
               00000001
             </fileID>
SC712 ──     <date>
               2006/01/20
             </date>
           </printInfo>
         </startJob>
```

FIG. 10

```
SC1001  <defaultSettingCapabilities>
SC1002    <mainUIs>
SC1003      <printModes>
              color monochrome
            </printModes>
          </mainUIs>
SC1004    <subUIs>
SC1005      <brightnesses>
              -3 -2 -1 0 +1 +2 +3
            </brightnesses>
SC1006      <levelAjdusts>
              auto off on
            </levelAdjusts>
SC1007      <faceBrighters>
              auto off on
            </faceBrighters>
SC1008      <redEyeRemovals>
              auto off on
            </redEyeRemovals>
          </subUIs>
SC1009    <detailUIs>
SC1010      <contrasts>
              -3 -2 -1 0 +1 +2 +3
            </contrasts>
SC1011      <saturations>
              -3 -2 -1 0 +1 +2 +3
            </saturations>
SC1012      <hues>
              -3 -2 -1 0 +1 +2 +3
            </hues>
SC1013      <colorBalances>
SC1014        <reds>
                -5 -4 -3 -2 -1 0 +1 +2 +3 +4 +5
              </reds>
SC1015        <greens>
                -5 -4 -3 -2 -1 0 +1 +2 +3 +4 +5
              </greens>
SC1016        <blues>
                -5 -4 -3 -2 -1 0 +1 +2 +3 +4 +5
              </blues>
            </colorBalances>
          </detailUIs>
        </defaultSettingCapabilities>
```

FIG. 11

```
SC1101 — <defaultSetting>
SC1102 —   <mainUI>
SC1103 —     <printMode>
               color
             </printMode>
           </mainUI>
SC1104 —   <subUI>
SC1105 —     <brightness>
               +2
             </brightness>
SC1106 —     <levelAjdust>
               auto
             </levelAdjust>
SC1107 —     <faceBrighter>
               off
             </faceBrighter>
SC1108 —     <redEyeRemoval>
               off
             </redEyeRemoval>
           </subUI>
SC1109 —   <detailUI>
SC1110 —     <contrast>
               −2
             </contrast>
SC1111 —     <saturation>
               +2
             </saturation>
SC1112 —     <hue>
               +1
             </hue>
SC1113 —     <colorBalance>
SC1114 —       <red>
                 +2
               </reds>
SC1115 —       <green>
                 +3
               </green>
SC1116 —       <blue>
                 −1
               </blue>
             </colorBalance>
           </detailUI>
         </defaultSetting>
```

FIG. 12

```
SC1201  <defaultSettingCapabilities>
SC1202    <mainUIs>
SC1203      <printModes>
            color
            </printModes>
          </mainUIs>
SC1204    <subUIs>
SC1205      <brightnesses>
              -3 -2 -1 0 +1 +2 +3
            </brightnesses>
SC1206      <levelAjdusts>
              auto off on
            </levelAdjusts>
SC1207      <faceBrighters>
              auto off on
            </faceBrighters>
SC1208      <redEyeRemovals>
              auto off on
            </redEyeRemovals>
          </subUIs>
SC1209    <detailUIs>
SC1210      <contrasts>
              -3 -2 -1 0 +1 +2 +3
            </contrasts>
SC1211      <saturations>
              -3 -2 -1 0 +1 +2 +3
            </saturations>
SC1212      <hues>
              -3 -2 -1 0 +1 +2 +3
            </hues>
SC1213      <colorBalances>
SC1214        <reds>
                -3 -2 -1 0 +1 +2 +3
              </reds>
SC1215        <greens>
                -3 -2 -1 0 +1 +2 +3
              </greens>
SC1216        <blues>
                -3 -2 -1 0 +1 +2 +3
              </blues>
            </colorBalances>
          </detailUIs>
        </defaultSettingCapabilities>
SC1221  <defaultSettingCapabilities>
SC1222    <mainUIs>
SC1223      <printModes>
              Monochrome
            </printModes>
          </mainUIs>
SC1224    <subUIs>
SC1225      <brightnesses>
              -2 -1 0 +1 +2
            </brightnesses>
SC1226      <levelAjdusts>
              auto off on
            </levelAdjusts>
SC1227      <faceBrighters>
              auto off on
            </faceBrighters>
SC1228      <redEyeRemovals>
              auto off on
            </redEyeRemovals>
          </subUIs>
        </defaultSettingCapabilities>
```

FIG. 13

```
SC1301 — <capabilities>
SC1302 —     <jobConfigs>
SC1303 —         <qualities>
                    draft normal fine
                </qualities>
SC1304 —         <paperSizes>
                    L 2L A4 Hagaki
                </paperSizes>
SC1305 —         <paperTypes>
                    Plain Photo
                </paperTypes>
SC1306 —         <fileTypes>
                    Jpeg Tiff
                </fileTypes>
SC1307 —         <datePrints>
                    Off On
                </datePrints>
SC1308 —         <imageOptimizes>
                    PrinterDependent Off On
                </imageOptimizes>
SC1309 —         <croppings>
                    Off On
                </croppings>
             </jobConfigs>
         </capabilities>
```

IMAGE-PROVIDING APPARATUS, IMAGE-PRINTING APPARATUS AND IMAGE-PRINTING SYSTEM COMPRISED THEREOF

BACKGROUND OF THE INVENTION

1. Field of the Invention

The present invention relates to an image-providing apparatus that communicates directly with an image-printing apparatus, an image-printing apparatus that communicates with an image-providing apparatus, and further, an image-printing system created by communication between an image-providing apparatus and an image-printing apparatus.

2. Description of the Related Art

When printing an image captured with a digital camera, the typical procedure involves scanning the image to be printed into a personal computer (hereinafter "PC") and printing it with a printer that is connected to the PC using an application running on the PC.

It should be noted that, in this specification, devices that are provided with the capability to record a captured image in digital data format are collectively called digital cameras ("DSC"). Therefore, a digital video camera that has a still-image capture function is of course one example of what in this specification is called a digital camera, as is a mobile phone, PDA or the like equipped with a digital camera.

In the procedure described above, because the image data is sent to the printer through the PC, a PC is necessary for printing. Moreover, in order to print an image stored in the DSC, the PC must be activated for each printing.

To remedy this problem, a photo-direct printing technology that connects the DSC and the printer directly and prints without going through the PC is known (Japanese Patent No. 3530847). In this case, instructions and the like from the user to the printer are executed using the display device and the operation panel (consisting of keys, switches and the like) with which the DSC is ordinarily equipped. Hereinafter, a printing system in which the image-providing apparatus and the image-printing apparatus are connected, as in a system in which the DSC and the printer are connected, is called a photo-direct printing system.

There are several advantages to a photo-direct printing system. Since it is not necessary to activate a PC, printing can of course be performed with ease. Moreover, since a PC is not required, the system can be constructed inexpensively. In addition, since such a system has a major advantage in that it uses the display device with which the DSC is ordinarily equipped as the means for confirming all manner of instructions and in particular of confirming the image that is about to be printed, a special display device to confirm the image is not required for the printer and thus the cost can be further reduced.

In addition, in order to achieve a photo-direct printing system that does not depend on the DSC and printer manufacturer, a unified standard for photo-direct printing system has recently been proposed and adopted for virtually all commercially available DSC and printers, such that setting certain standardized items has made possible a type of printing in which the print quality, paper size, paper type, file type and so forth are specified.

However, for those settings that are not specified by standard, in carrying out these settings and the processes based on them, such as print adjustment and correction, the following problems arise:

In those cases in which the uniform standard restricts a given standard extension by venders, the extension is limited to the restricted range. As a result, until such time as the standard itself is upgraded to a new version or the desired print adjustment and correction functions are themselves standardized, any print adjustment or correction function that cannot be implemented with an extension within the restricted range can only be provided as an incompatible proprietary function.

Even when implementing desired print adjustment and correction functions that are incompatible with the standard by using vendor-specific methods, since uniform standard support is required it is ultimately necessary to deal with two sets of procedures, which does not facilitate efficient development.

Conventionally, in the photo-direct printing system, there is a method of implementing print adjustments and corrections that are not defined by the standards. Specifically, this is not a photo-direct printing procedure conducted between the DSC and the printer but a method of carrying out photo-direct printing after configuring the printer to execute print adjustment and correction on its own. In other words, the photo-direct printing procedure is left as is while the printer print settings are changed, so as to reflect the corrections and adjustments in the results. In this case, since the instructions for print adjustment and correction are provided by the printer, it is necessary to provide a special display device such as a color display on the printer or to connect a PC to the printer and configure the desired print adjustment/correction for the printer using a PC application.

In any case, however, the user is required to use both the printer user interface (UI) and the DSC UI, or the PC application UI and the DSC UI, and to configure two apparatuses, which complicates operation. Moreover, since it is not possible to check all configuration setting contents with just the DSC UI alone, ultimately it is necessary to check both UI repeatedly prior to printing.

SUMMARY OF THE INVENTION

The present invention is conceived in light of the problems of the conventional art as described above, and has as its main object to provide an image-providing apparatus, an image-printing apparatus and an image-printing system comprised thereof that is capable of providing a cooperative capability separate from the standardized capabilities while improving user operability.

According to an aspect of the present invention, there is provided an image-providing apparatus capable of communicating directly with an image-printing apparatus, comprising: a first transmission unit which transmits to the image-printing apparatus first information indicating that the image-providing apparatus supports a first printing service; a second transmission unit which transmits to the image-printing apparatus second information indicating that the image-providing apparatus supports a second printing service that cooperates with the first printing service and provides more feature which are not provided by the first printing service; a first reception unit which receives from the image-printing apparatus third information indicating that the image-printing apparatus supports the first printing service; a second reception unit which receives from the image-printing apparatus fourth information indicating that the image-printing apparatus supports the second printing service; a third transmission unit which transmits to the image-printing apparatus a service configuration relating to the second printing service; and a fourth transmission unit which transmits to the image-printing apparatus a service configuration relating to the first printing service and an initiating instruction for the first printing service after transmission by the third transmission means is completed.

According to another aspect of the present invention, there is provided an image-printing apparatus capable of communicating directly with an image-providing apparatus, comprising: a third reception unit which receives from the image-providing apparatus first information indicating that the image-providing apparatus supports a first printing service; a fourth reception unit which receives from the image-providing apparatus second information indicating that the image-providing apparatus supports a second printing service that cooperates with the first printing service and provides more feature which are not provided by the first printing service; a fifth transmission unit which transmits to the image-providing apparatus third information indicating that the image-printing apparatus supports the first printing service; a sixth transmission unit which, prior to transmission by the fifth transmission unit, transmits to the image-providing apparatus fourth information indicating that the image-printing apparatus supports the second printing service; a fifth reception unit which receives from the image-providing apparatus a service configuration relating to the second printing service; and a sixth reception unit which receives from the image-providing apparatus a service configuration relating to the first printing service and an initiating instruction for the first printing service.

According to a further aspect of the present invention, there is provided an image-printing system formed by directly connecting an image-printing apparatus and an image-providing apparatus to each other, the image-providing apparatus comprising: a first transmission unit which transmits to the image-printing apparatus first information indicating that the image-providing apparatus supports a first printing service; a second transmission unit which transmits to the image-printing apparatus second information indicating that the image-providing apparatus supports a second printing service that cooperates with the first printing service and provides more feature which are not provided by the first printing service; a first reception unit which receives from the image-printing apparatus third information indicating that the image-printing apparatus supports the first printing service; a second reception unit which receives from the image-printing apparatus fourth information indicating that the image-printing apparatus supports the second printing service; a third transmission unit which transmits to the image-printing apparatus a service configuration relating to the second printing service; and a fourth transmission unit which transmits to the image-printing apparatus a service configuration relating to the first printing service and an initiating instruction for the first service after transmission by the third transmission means is completed; the image-printing apparatus comprising: a third reception unit which receives the first information from the image-providing apparatus; a fourth reception unit which receives the second information from the image-providing apparatus; a fifth transmission unit which transmits the third information to the image-providing apparatus; a sixth transmission unit for transmitting the fourth information prior to transmission by the fifth transmission unit; a fifth reception unit which receives a service configuration relating to the second printing service from the image-providing apparatus; and a sixth reception unit which receives a service configuration relating to the first printing service and an initiating instruction for the first printing service from the image-providing apparatus.

According to yet further aspect of the present invention, there is provided a control method for an image-providing apparatus capable of communicating directly with an image-printing apparatus, the method comprising: a first transmission step which transmits to the image-printing apparatus first information indicating that the image-providing apparatus supports a first printing service; a second transmission step which transmits to the image-printing apparatus second information indicating that the image-providing apparatus supports a second printing service that cooperates with the first printing service and provides more feature which are not provided by the first printing service; a first reception step which receives from the image-printing apparatus third information indicating that the image-printing apparatus supports the first printing service; a second reception step which receives from the image-printing apparatus fourth information indicating that the image-printing apparatus supports the second printing service; a third transmission step which transmits to the image-printing apparatus a service configuration relating to the second printing service; and a fourth transmission step which transmits to the image-printing apparatus a service configuration relating to the first printing service and an initiating instruction for the first printing service after transmission in the third transmission step is completed.

According to another aspect of the present invention, there is provided a control method for an image-printing apparatus capable of communicating directly with an image-providing apparatus, the method comprising: a third reception step which receives from the image-providing apparatus first information indicating that the image-providing apparatus supports a first printing service; a fourth reception step which receives from the image-providing apparatus second information indicating that the image-providing apparatus supports a second printing service that cooperates with the first printing service and provides more feature which are not provided by the first printing service; a fifth transmission step which transmits to the image-providing apparatus third information indicating that the image-printing apparatus supports the first printing service; a sixth transmission step which, prior to transmission in the fifth transmission step, transmits to the image-providing apparatus fourth information indicating that the image-printing apparatus supports the second printing service; a fifth reception step which receives from the image-providing apparatus a service configuration relating to the second printing service; and a sixth reception step which receives from the image-providing apparatus a service configuration relating to the first printing service and an initiating instruction for the first printing service.

Further features of the present invention will become apparent from the following description of exemplary embodiments with reference to the attached drawings.

BRIEF DESCRIPTION OF THE DRAWINGS

FIG. 7 is a diagram illustrating a script file as one example of print configuration information transmitted from the Direct Print Service-DSC 502 in step S609 shown in FIG. 6;

FIG. 10 is a diagram showing an example of a default setting supported notification script "DSS_DIS_B" transmitted in step S952 shown in FIG. 9;

FIG. 11 is a diagram showing an example of a default setting information script "DSS_SET" transmitted in step S953 shown in FIG. 9;

FIG. 12 is a diagram showing an example of the default setting supported notification script "DSS_DIS_B" transmitted in a second embodiment of the present invention;

FIG. 13 is a diagram showing a script file as one example of print capability information obtained in step S608 shown in FIG. 6;

DESCRIPTION OF THE EMBODIMENTS

Preferred embodiments of the present invention will now be described in detail in accordance with the accompanying drawings.

(Description of the Basic Structure)

First, a description is given of the basic structure of the present invention. It should be noted that, in the following description, a system in which a printer as one example of an image-printing apparatus prints an image stored on a storage medium inside a digital still camera (DSC) as one example of an image-providing apparatus while communicating directly with the DSC is referred to as a photo-direct printing system. In addition, an image processing system that implements a photo-direct printing system is referred to as a direct printing system, and a printer adapted to a photo-direct printing system is referred to as a photo-direct printer.

Figure 1:
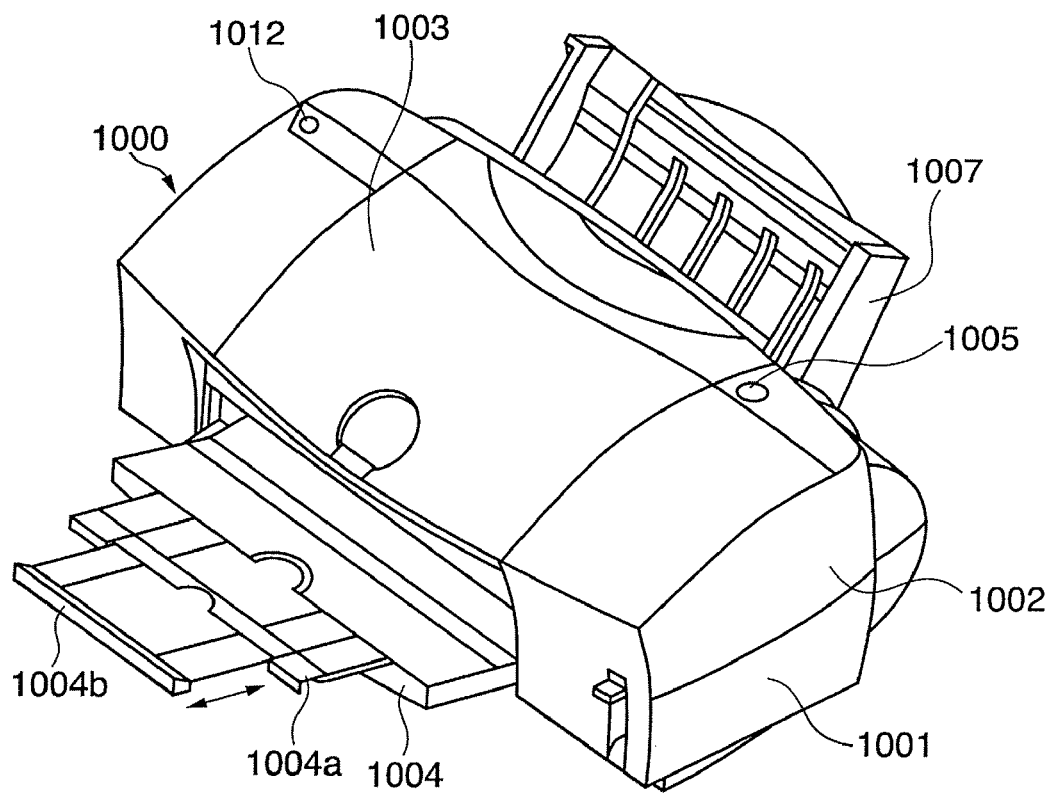
FIG. 1 is a perspective view showing an example of the external appearance of a photo-direct printer according to one embodiment of the present invention.

FIG. 1 shows a perspective view of the external appearance of a photo-direct printer (referred to as a PD printer) in an embodiment of the present invention.

In FIG. 1, a PD printer 1000 has the capabilities of a typical PC printer, receiving data from a host computer (PC) that it then prints. In addition, it is also provided with the capability to receive and print image data from a digital camera.

The body that forms the shell of the PD printer 1000 has external members consisting of a lower case 1001, an upper case 1002, an access cover 1003 and a discharge tray 1004. The lower case 1001 forms approximately the lower half of the PD printer 1000 and the upper case 1002 forms approximately the upper half of the PD printer 1000, respectively. The combination of these two cases forms an empty three-dimensional structure, in the top and front portions of which are formed respective openings.

Further, the discharge tray 1004 is retained along one edge by the lower case 1001 so as to be rotatable thereabout, such that the opening formed in the front of the lower case 1001 can be opened and closed by that rotation. As a result, by rotating the discharge tray 1004 forward so as to open the opening when executing printing, recording media such as paper or the like can be discharged therefrom, and moreover, the discharged recording media can be sequentially stacked. In addition, two auxiliary trays 1004a and 1004b are contained in the discharge tray 1004. By pulling the trays outward as necessary, the size of the discharge tray 1004 can be enlarged or reduced to fit the size of the recording media.

The access cover 1003 is retained along one edge by the upper case 1002 so as to be rotatable thereabout, such that the opening formed in the top can be opened and closed. Opening the access cover 1003 enables a recording head cartridge, not shown, or an ink tank, not shown, contained in the body to be replaced.

In addition, a power key 1005 is provided on the top of the upper case 1002. Reference numeral 1007 indicates an automatic feed unit, which automatically feeds the recording media into the apparatus body. Reference numeral 1012 indicates an external interface connector, in this case having a shape that conforms to USB (Universal Serial Bus) specification. Of course, the interface may conform to another standard. The PD printer 1000 is also provided with an interface on, for example, the back, in order to implement printing from the personal computer (PC) as well.

Figure 2:
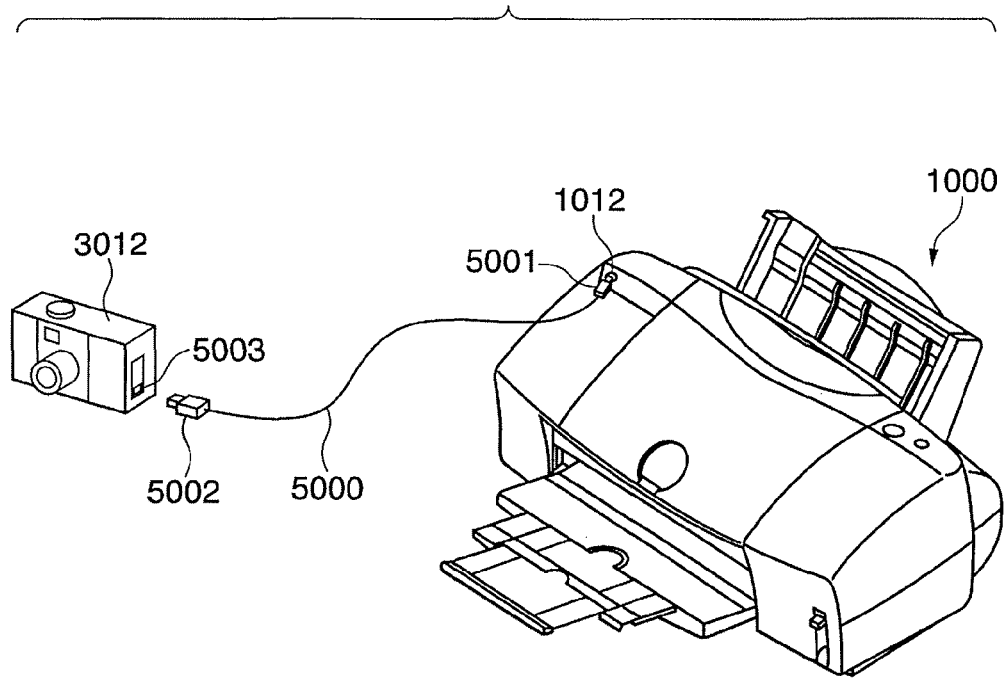
FIG. 2 is a diagram showing a direct printing system constructed by connecting a digital still camera to the PD printer shown in FIG. 1.

FIG. 2 is a diagram showing a direct printing system constructed by connecting a digital still camera to the PD printer shown in FIG. 1.

In the drawing, a cable 5000 (a USB cable), is provided with a connector 5001 for connecting to connector 1012 of the PD printer 1000 and a connector 5002 for connecting to a connection-use connector 5003 of a digital camera (DSC) 3012. It should be noted that, when connecting the digital camera 3012 to the PC, by connecting the aforementioned connector 5001 to the USB connector on the PC, a sensed image can be transferred to the PC.

In addition, the digital camera 3012 is constructed so as to be able to output image data present on a built-in or detachable recording medium via the connection-use connector 5003. Thus, as described above, by connecting the PD printer 1000 and the digital camera 3012 through the cable 5000 shown in FIG. 2, a direct printing system can be constructed.

Figure 3:
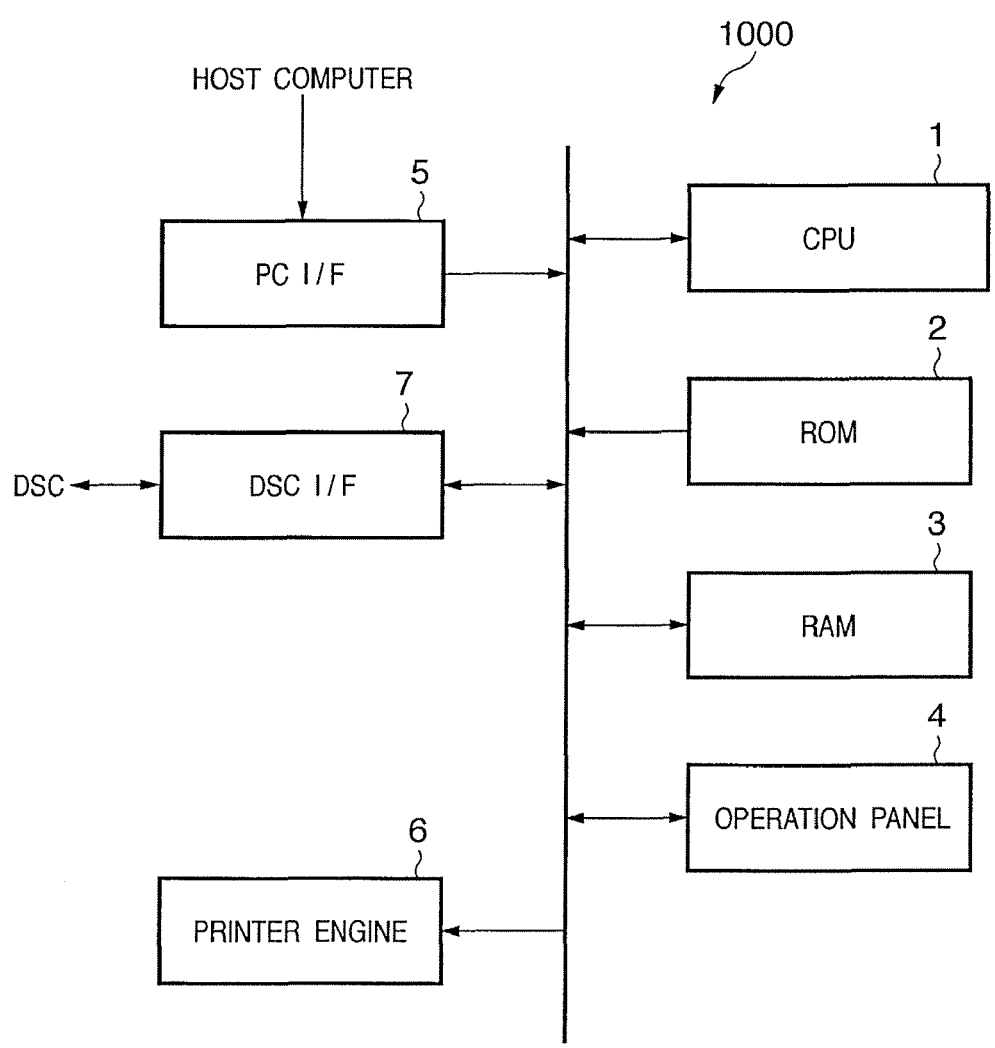
FIG. 3 is a block diagram of a control system of a PD printer according to an embodiment of the present invention.

FIG. 3 is a block diagram of the control system of the PD printer 1000.

In the drawing, reference numeral 1 indicates a CPU that exercises control over the entire apparatus, 2 indicates a ROM storing CPU 1 operating process procedures (programs) and fonts, and 3 indicates a RAM uses as a work area of the CPU 1. Reference numeral 4 indicates an operation panel. Reference numeral 5 indicates an interface for effecting a connection to a PC and 7 indicates an interface (USB host side) for effecting a connection to a DSC. Reference numeral 6 indicates a printer engine, which, in the present embodiment, is a printer engine that expels ink liquid using thermal energy, although the recording method is not limited thereto.

Figure 4:
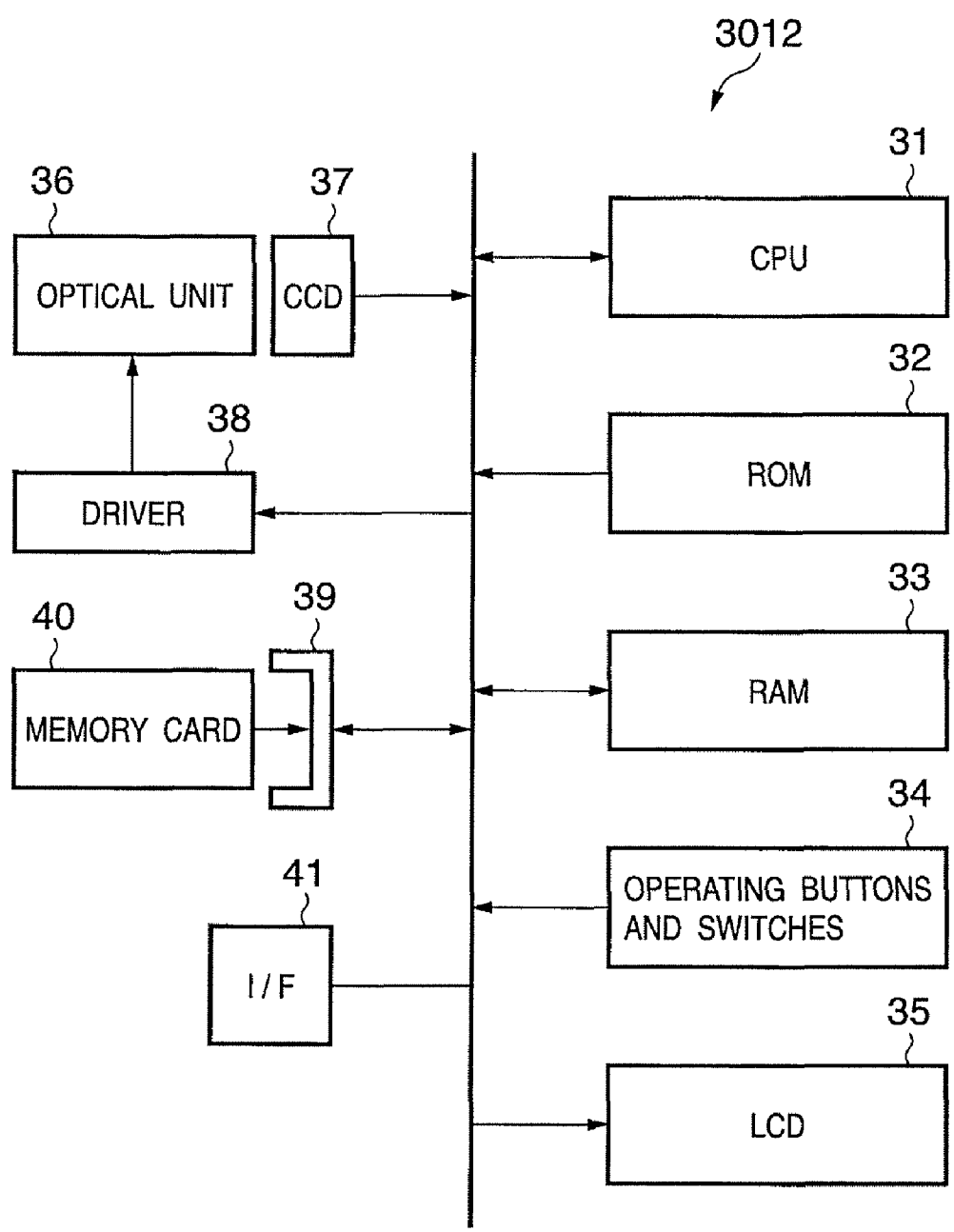
FIG. 4 is a block diagram of a digital still camera according to an embodiment of the present invention.

FIG. 4 is a block diagram of the DSC (digital still camera) 3012.

In the drawing, reference numeral 31 indicates a CPU that exercises control over the entire DSC and 32 indicates a ROM storing operating procedures for the CPU 31. Reference numeral 33 indicates a RAM used as a work area of the CPU 31 and 34 indicates a group of buttons and switches for carrying out various operations. Reference numeral 35 indicates a liquid crystal display (LCD), used to check a sensed image, to display a menu when carrying out various settings, and so forth. Reference numeral 36 indicates an optical unit, composed chiefly of lenses and their drive systems. Reference numeral 37 indicates an image sensing element (in this case a CCD) and 38 indicates a driver that controls the optical unit 36 under the control of the CPU 31. Reference numeral 39 indicates a connector for connecting a memory card 40 and 41 indicates a USB interface (USB device side) for connecting to a PC or to the PD printer 1000 of the present embodiment.

Figure 5:
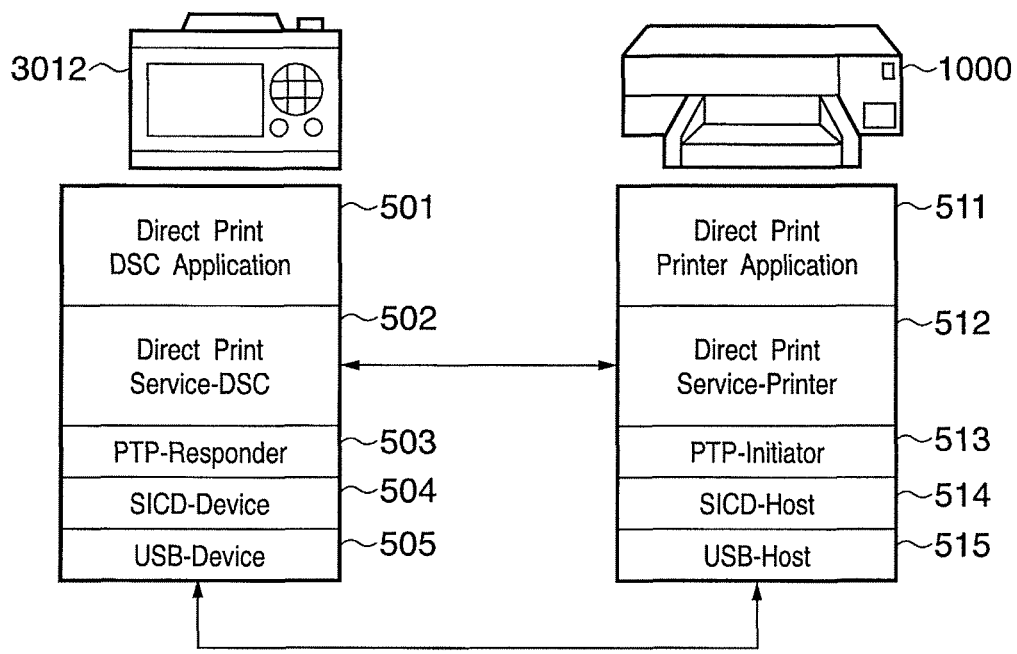
FIG. 5 is a diagram illustrating control software protocol stacks provided to a PD printer and a DSC in order to implement a standard direct printing system.

FIG. 5 illustrates control software protocol stacks for the PD printer 1000 and the DSC 3012 for implementing a direct printing system.

USB-Device 505 is a physical connection layer located at the bottom of the digital camera 3012 protocol stack. In the present embodiment, since the DSC 3012 and the PD printer 1000 are connected by a USB, a USB physical layer (device side) is installed.

SICD-Device 504 is a device class layer that defines behavior on the USB. In the present embodiment, a SICD (Still-Image Class)-Device that defines behavior on the USB is used.

PTP-Responder 503 is a transfer protocol layer for transferring a given file. In the present embodiment, a PTP (Picture Transfer Protocol)-Responder that implements file transfer using the bottom layers USB-Device 505 and SICD-Device 504 is used.

Direct Print Service-DSC 502 is a direct printing protocol layer that implements a direct print capability. The present embodiment uses a direct printing protocol called a Direct Print Service-DSC that utilizes the lower-layer PTP-Responder 503 file transfer function.

Direct Print DSC Application 501 is an application layer that, using the lower-layer direct print capability as well as the group of switches, LCD display unit, connectors, recording media and so forth, forms the digital camera 3012 side of the direct printing system.

USB-Host 515 is the physical connection layer of the PD printer 1000. In the present embodiment, the DSC 3012 and the PD printer 1000 are connected with a USB, and therefore a USB physical layer (host side) is installed.

SICD-Host 514 is a device class layer that controls the device according to the device class of the connected device. In the present embodiment, SICD (Still-Image Class)-Host is used to control the digital camera 3012 as a SICD device.

PTP-Initiator 513 is a transfer protocol layer for transferring a given file. In the present photo-direct printing system, a PTP (Picture Transfer Protocol)-Initiator that implements file transfer using the lower-layer USB-Host 515 and SICD-Host 514 is utilized.

Direct Print Service-Printer 512 is a direct printing protocol layer for implementing a direct print capability. The present embodiment uses a direct printing protocol called Direct Print Service-Printer that utilizes the lower-layer PTP-Initiator 513 file transfer function.

Direct Print Printer Application 511 is an application layer that, using the lower-layer direct print capability as well as such hardware as the operation panel 4 of the PD printer 1000, forms the PD printer 1000 side of the direct printing system.

In such a direct printing system, physically the. USB-Device 505 and the USB-Host 515 communicate directly with each other through their respective device interfaces. Logically, however, corresponding layer stacks (501 and 511, 502 and 512, 503 and 513, 504 and 514) communicate directly with each other.

Figure 6:
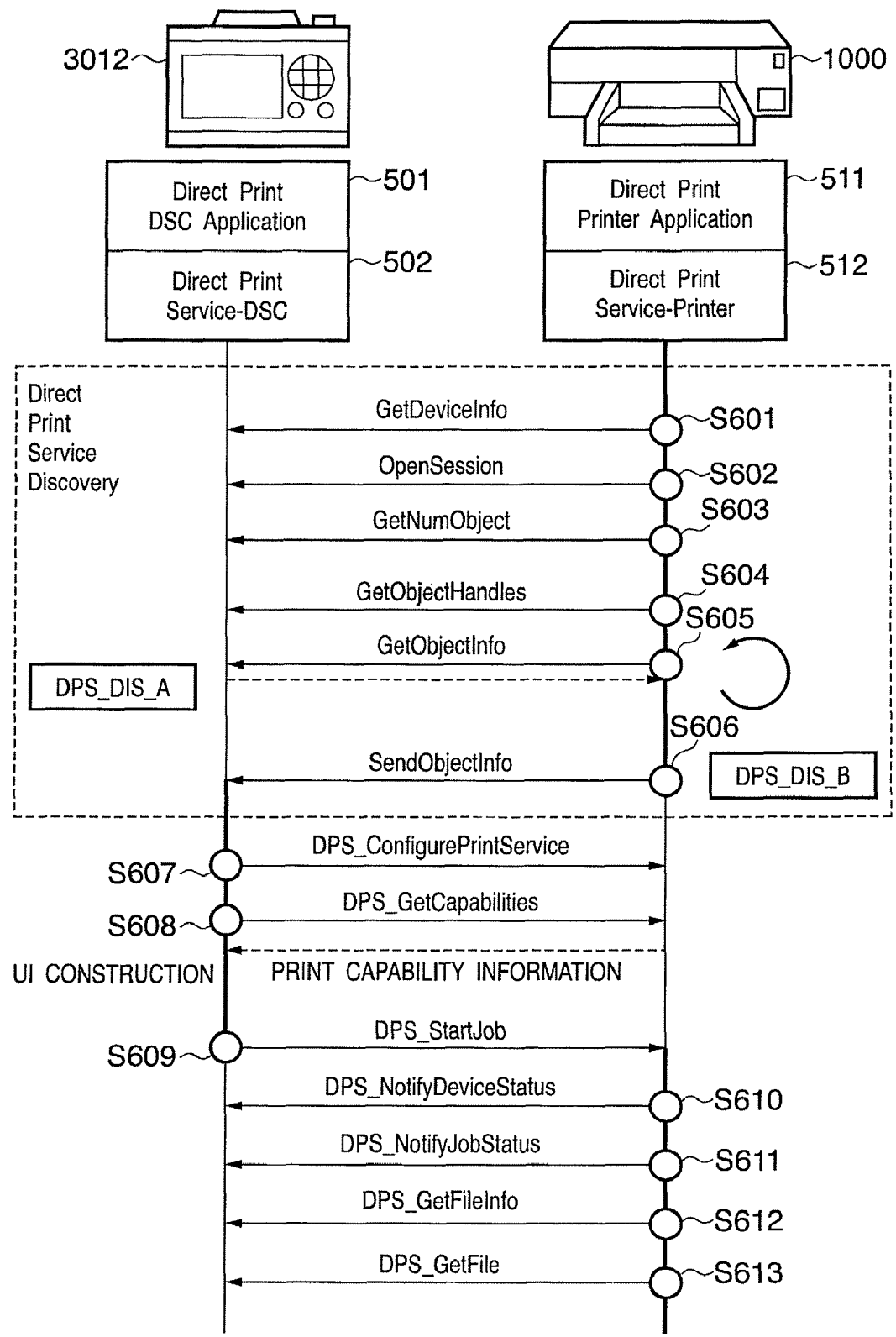
FIG. 6 is a sequence diagram showing a processing procedure of a direct printing system using the control program shown in FIG. 5.

FIG. 6 is a sequence diagram showing a processing procedure of a direct printing system using the control program shown in FIG. 5.

The drawing illustrates the processing procedure between the direct printing protocol layers Direct Print Service-DSC 502 and Direct Print Service-Printer 512. The vertical direction in the drawing represents the time axis. The arrows indicate the direction of action. Step S601-step S606, step S610-step S613 are actions that the Direct Print Service 512 issues. Step S607-step S609 are actions that the Direct Print Service 502 issues. It should be noted that, in FIG. 6, in some portions a description of the response to an action is omitted.

In addition, the thickness of the line that represents the time axis indicates which of the Direct Print Service 502, 512 has the right of action, with a thin line indicating a standby state and a thick line indicating a right of action. Specifically, the Direct Print Service 502 is in a standby state from the time of connection to the execution of the action of step S606, after which the Direct Print Service 512 enters a standby state until the execution of the action of step S609, after which the Direct Print Service 502 enters a standby state.

The procedure from step S601-step S606 is a Direct Print Service Discovery process, in which the digital camera 3012 and the PD printer 1000 each determines whether or not the connected device is a Direct Print Service-capable device.

As shown in the drawing, during the Discovery process the PD printer 1000 (Direct Print Service-Printer 512) has the right of action. This is because the physical layer of the PD printer 1000 is the USB Host 515, and the PTP Operation used in the Discovery process must always be issued from the USB Host side.

First, in step S601, the Direct Print Service-Printer 512 issues a PTP GetDeviceInfo Operation and obtains the digital camera 3012 PTP-Responder 503 function. The PTP-Responder 503 returns information on capabilities by DeviceinfoDataset, in which information relating to support for the Direct Print Service-DSC capability is also included. From the information thus obtained the Direct Print Service-Printer 512 then determines whether or not the Direct Print Service-DSC function can be supported. If it cannot be supported, the USB connection is terminated and the process is ended.

Next, in step S602, the Direct Print Service-Printer 512 issues an OpenSession Operation and commences a PTP Session.

Then, in steps S603-S605, the Direct Print Service-Printer 512 confirms whether or not the Direct Print Service-DSC 502 holds Direct Print Service Discovery script (Object name "DPS_DIS_A").

In step S603, the Direct Print Service-Printer 512 issues a GetNumObject Operation (specifying "script" (0×3002) in the argument (ObjectFormatCode) specifying an object that obtains a number)) and obtains the number of scripts n that the Direct Print Service-DSC 502 holds.

Next, in step S604, the Direct Print Service-Printer 512 issues a GetObjectHandles Operation (specifying "script" in the argument) and obtains n Object Handles assigned to the n scripts that the Direct Print Service-DSC 502 holds.

Then, in step S605, the Direct Print Service-Printer 512 issues a GetObjectInfo Operation to each of the n ObjectHandles thus obtained and determines whether or not an object with the name "DPS_DIS_A" is present in the DSC 3012. If the results of the determination indicate No, then step S605 is repeated a maximum of n times and a determination made for all n scripts that the DSC 3012 has. Specifically, the Direct Print Service-Printer 512 checks the ObjectInfo-Dataset returned for the GetObjectInfo Operation and determines whether or not the object name (filename) is "DPS_DIS_A".

If the determination results of the all n determinations are No, then the Direct Print Service-Printer 512 assumes that the digital camera 3012 does not support Direct Print Service-DSC, terminates the USB connection, and ends the process.

If in step S605 the existence of script with the object name "DPS_DIS_A" is confirmed, then the Direct Print Service-Printer 512 assumes that the DSC 3012 supports Direct Print Service-DSC, skips the issuance of actions and determinations for the remaining script, and proceeds to step S606.

At this point, the Direct Print Service-Printer 512 has confirmed that the digital camera 3012 that is the connected device supports Direct Print Service-DSC. However, the Direct Print Service-DSC 502 does not know whether or not the PD printer 1000 that is the connected device supports Direct Print Service-Printer.

Accordingly, in step S606, the Direct Print Service-Printer 512 issues a SendObjectInfo Operation. By this action notice is issued to the effect that an Object with the name "DPS_DIS_B" is to be transmitted from the PD printer 1000, notifying the DSC 3012 that the PD printer 1000 supports Direct Print Service-Printer.

At this point, the Direct Print Service-DSC 502 knows that the PD printer 1000 that is the connected device supports Direct Print Service-Printer. Thus, both the Direct Print Service-DSC 502 and the Direct Print Service-Printer 512 know that each supports Direct Print Service, and thereafter it is possible to issue a Direct Print Service Operation. Then, typically, as the Direct Print Service the PD printer 1000 is the server and the digital camera 3012 is the client, and therefore the right of action thereafter shifts to the digital camera 3012.

In step S607, the Direct Print Service-DSC 502 issues a DPS_ConfigurePrintService Operation and commences Direct Print Service.

Next, in step S608, the Direct Print Service-DSC 502 issues a DPS_GetCapabilities Operation and obtains information indicating the printing capabilities that the Direct Print Service-Printer 512 supports (print capability information).

FIG. 13 is a diagram showing a script file as one example of print capability information obtained in step S608 shown in FIG. 6. In the example shown in FIG. 13, print capability items are indicated by tags, with the value of an item described in a format that is described between a start tag and an end tag.

sc1301 is a tag that indicates the start of supported capabilities description.

sc1302 is a tag that indicates the start of supported print capability description.

sc1303 is a tag that indicates the start of supported print quality description. In this example, the tag indicates that "draft", which is the lowest print quality, "normal", which is the standard print quality, and "fine", which is the highest print quality, are supported.

sc1304 is a tag that indicates the start of supported paper size description. In this example, the four paper sizes "L", "2L", "A4" and "postcard" are supported.

sc1305 is a tag that indicates the start of supported paper type description. In this example, two types of paper are supported, "Plain", which is plain paper, and "Photo", which is photo paper.

sc1306 is a tag that indicates the start of supported image format description. In this example, two types of image formats, "Jpeg" and "Tiff", are supported.

sc1307 is a tag that indicates the start of supported date-print configuration description. In this example, two types of date-print configurations, "Off" indicating that printing with the date will not be performed, and "On" indicating that printing with the date will be performed, are supported.

sc1308 is a tag that indicates the start of supported image correction configuration description. In this example, three types of image correction settings are supported: "Printer Dependent", which conforms to the configuration at the Printer; "Off", in which correction is not performed at the Printer; and "On", in which correction is performed at the Printer.

sc1309 is a tag that indicates the start of supported cropping area configuration description. In this example two types, "Off", in which cropping is not performed, and "On", in which cropping is performed, are supported.

When the print capability information is obtained, a configuration menu (user interface: UI) based on the capability information thus obtained is constructed by the Direct Print DSC Application 501 of the DSC 3012 and displayed on the LCD 35. Using the DSC 3012 group of buttons and switches 34, the user then configures the print capability that the PD printer 1000 supports as well as selects an image to be printed (print image) from among the captured images on the memory card. Then, once the user selects and instructs the start of printing using the group of buttons and switches 34, the process proceeds to step S609.

In step S609, the Direct Print Service-DSC 502 issues a DPS_StartJob Operation and commences the printing process by Direct Print System.

FIG. 7 is a diagram illustrating a script file as one example of print configuration information transmitted from the Direct Print Service-DSC 502 in step S609.

The individual settings of each of SC701-sc709 correspond to those of SC1301-SC1309 shown in FIG. 13.

SC710-SC712 are print information additionally set during print configuration.

SC701 is a tag indicating the start of print configuration description.

SC702 is a tag indicating the start of the print capability configuration description.

SC703 is a tag indicating the start of the print quality configuration description. In the present example, this tag is set at "normal", the standard print quality.

SC704 is a tag indicating the start of the paper size configuration description. In the present example, this tag is set at "L" for the paper size.

SC705 is a tag indicating the start of the paper type configuration description. In the present example, this tag is set at "Photo" for photo paper as the paper type.

SC706 is a tag indicating the start of the image format configuration description. In the present example, this tag is set at "Jpeg" for the image format.

SC707 is a tag indicating the start of the date-print configuration description. In the present example, this tag is set at "On" for the date-print configuration.

SC708 is a tag indicating the start of the image correction configuration description. In the present example, this tag is set at "PrinterDependent", which conforms to the configuration at the Printer, for the image correction setting.

SC709 is a tag indicating the start of the cropping area configuration description. In the present example, this tag is set at "Off", in which cropping is not performed.

SC710 is a tag indicating the start of the print photo configuration description.

SC711 is a tag indicating the start of the print photo configuration description. In the present example, this tag is set at "00000001" for the print photo.

SC712 is a tag indicating the start of the date-print configuration description. In the present example, this tag is set at "2006 Jan. 20" for the date-print configuration.

Once step S609 is completed, the printing process is commenced. Thereafter, such rights of action as issuance of print status, photo image file acquisition and the like shift to the PD printer 1000.

Then, in step S610, the PD printer 1000 issues a DPS_NotifyDeviceStatus and reports that printing has started.

In step S611, the PD printer 1000 issues a DPS_NotifyJobStatus and indicates the status of the print job.

In step S612, the PD printer 1000 obtains the required photo image file (in the example shown in FIG. 7, the photo image file with the ID=00000001) attribute information.

In step S613, the PD printer 1000 obtains the required photo file image (in the example shown in FIG. 7, the photo image file with the ID=00000001) itself.

Then, once printing is completed, the PD printer 1000 issues a notice to that effect by DPS_NotifyDeviceStatus, returns to the post-step S608 status, and continues processing from there.

Thus, as described above, in the photo-direct printing system, by print configuration of the items described in FIG. 13 it is possible to perform printing in which the print quality, paper size, paper type, file type and the like are specified.

However, when carrying out print adjustment and correction for those items that are not described in FIG. 13, in other words, for those items that are not defined by the photo-direct printing standards, the problem described above remains.

Accordingly, print adjustment and correction are implemented while maintaining photo-direct print service connectivity by using, as a cooperative function, a default setting service that is separate from the standardized photo-direct print service and that sets the printer-side default settings.

First Embodiment

Figure 8:
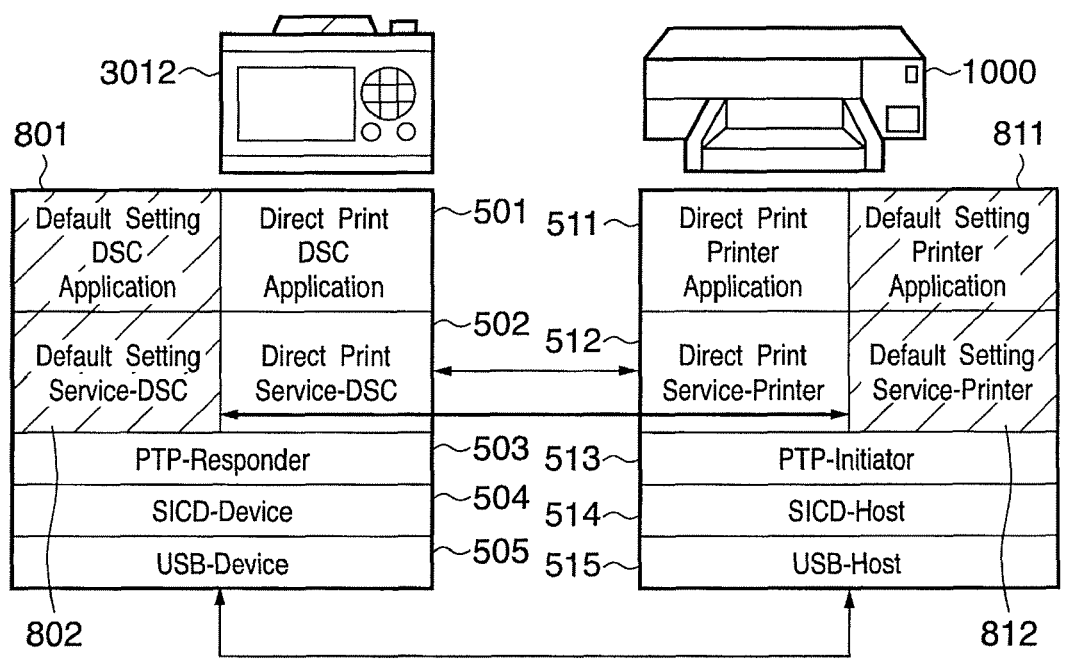
FIG. 8 is a diagram illustrating the protocol stacks of the control programs of the DSC and the PD printer in a first embodiment of the present invention.

FIG. 8 is a diagram illustrating the protocol stacks of the control programs of the DSC 3012 and the PD printer 1000 according to a first embodiment of the present invention. In FIG. 8 the same reference numerals are used for the same stacks shown in FIG. 5, and descriptions thereof are omitted.

As is clear from a comparison of FIG. 5 and FIG. 8, in the present embodiment, the protocol stacks 801, 802, 811, 812 according to the default settings are added as the top layers of the PTP protocol layer.

Default Setting Service-DSC 802 is a default setting protocol layer that uses the lower-layer PTP-Responder file transfer function to implement the default setting function.

Default Setting DSC Application 801 is a default setting application layer that forms the actual digital camera 3012 side in the default setting system using the lower-layer default setting function as well as the group of buttons and switches 34, the LCD 35, the connector 39, the storage medium 40 and the like.

Default Setting Service-Printer 812 is a default setting protocol layer that implements the default setting function using the lower-layer PTP-Initiator file transfer function.

Default Setting Printer Application 811 is a default setting application layer that forms the actual PD printer 1000 side of the default setting system using the lower-layer default setting function as well as the operation panel 4 shown in FIG. 3 and the like.

As described in FIG. 5, in the present embodiment as well, physically, the USB-Device 505 and the USB-Host 515 communicate directly with each other through the USB interface. Logically, however, stacks of the same layer (801 and 811, and 802 and 812) communicate directly with each other.

Figure 9:
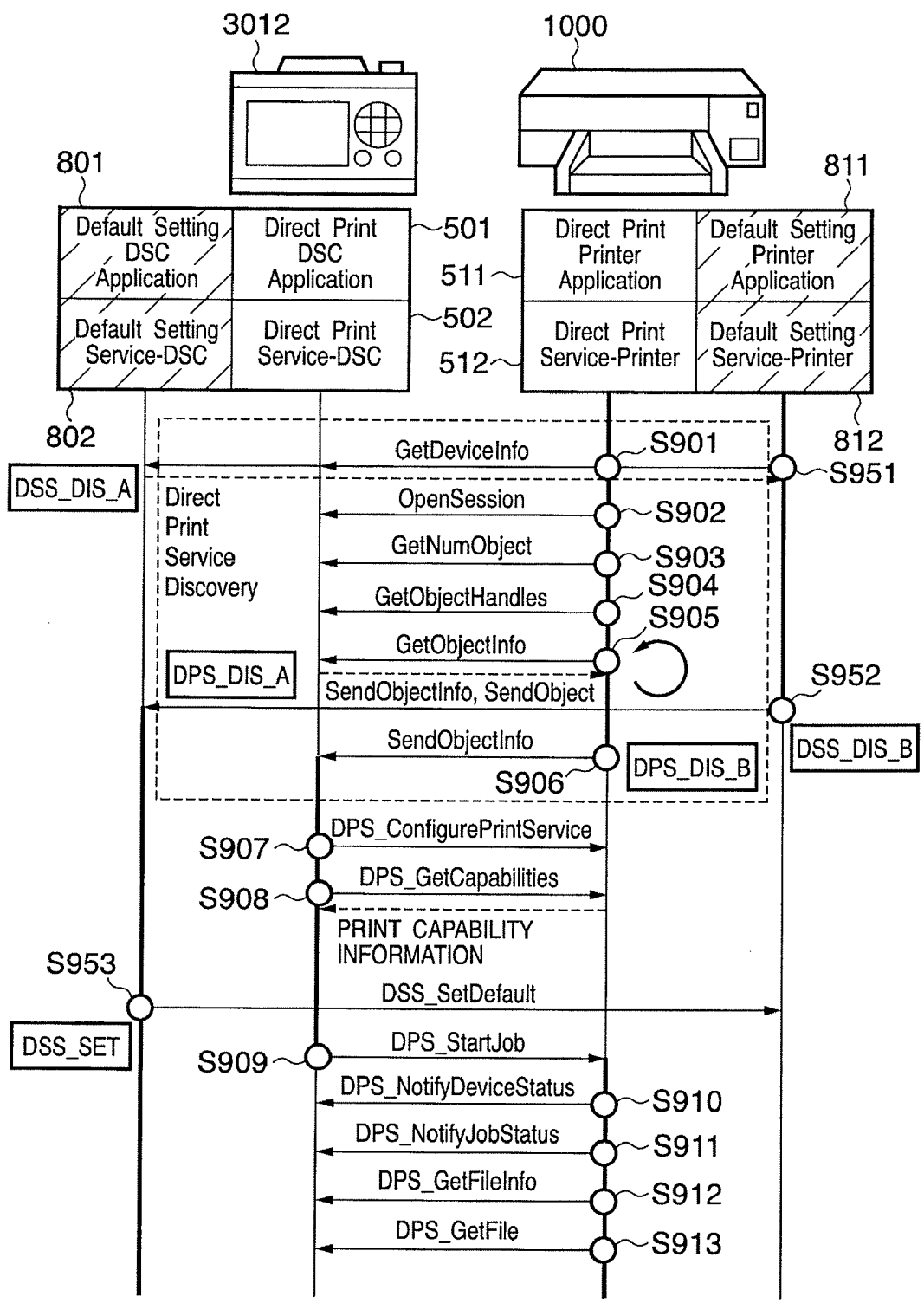
FIG. 9 is a sequence diagram illustrating the processing procedure of the direct printing system according to the first embodiment of the present invention using the control program shown in FIG. 8.

FIG. 9 is a sequence diagram showing the processing procedure of the direct printing system using the control program shown in FIG. 8.

In steps S901-S913 the behavior and movement are the same as those of steps S601-S613 shown in FIG. 6, and descriptions thereof are omitted.

In the present drawing what is different from FIG. 6 is the presence of steps S951-S953 that are the operation of the default setting system, and therefore the processing flow is described with particular attention to these steps. Steps S951-S952 is the Discovery process, in which each device confirms that the other supports Default Setting Service. Step S953 is the act of setting defaults using the actual Default Setting Service.

First, in step S951, 812 issues a GetDeviceInfo Operation and obtains the capabilities of the PTP-Responder 503 of the digital camera 3012. Here, it is determined whether or not the digital camera 3012 can support the Default Setting Service-DSC function, and if it cannot then the USB connection is terminated and the process is ended.

In the present embodiment, information that is the equivalent of the "DSS_DIS_A" information indicating that the digital camera 3012 supports the Default Setting Service is included in the Response (DeviceInfo Dataset) to the GetDeviceInfo Operation. As a method for including information equivalent to "DSS_DIS_A" in the Response, there is, for example, the following:

Set an image format that is unique to the vendor (to be described later) as the default setting supported notification script "DSS_DIS_B" and the default setting script "DSS_SET". Then, check the supported image format described in the (ImageFormats field) in the Response to the GetDeviceInfo.

If the image format unique to the vendor for the aforementioned "DSS_DIS_B" and "DSS_SET" are included in the supported image formats, then the Default Setting Service can be deemed to be supported. In other words, the information that represents this vendor-specific image format is information that is the equivalent of "DSS_DIS_A".

At this point, the PD printer 1000 can ascertain that the digital camera 3012 supports Default Setting Service-DSC. However, the digital camera 3012 cannot yet know whether or not the PD printer 1000 supports Default Setting Service-Printer.

It should be noted that, in the present embodiment, step S951 is installed in such a way that, when seen from the DSC 3012 side, step S951 cannot be distinguished from step S901, in which a GetInfoDevice is issued in a service that conforms to standard. This is done in order to ensure normal operation when the DSC 3012 supports only operations that are defined by the standard.

In other words, the arrangement described above is used in order to prevent the occurrence of trouble when the DSC 3012 does not support Default Setting Service-DSC or with a device that was not designed with the existence of Default Setting Service-Printer in mind (that is, an incompatible device).

Assume that the process of step S951 is implemented as a process separate from step S901, and that it is an operation outside the standards of the Direct Print Service. In this case, if the DSC 3012 is an incompatible device, the operation of the PD printer 1000 might be deemed to be a malfunction and there is a possibility that the USB connection might be severed as a precaution.

In order to avoid the danger of the occurrence of such an operation, it is desirable that the process of step S951 be installed so as to be used jointly with the existing Direct Print Service process step S901.

Thereafter, as with steps S602-S605 shown in FIG. 6, the processes of steps S902-S905 are performed.

Even when step S905 is completed, the Direct Print Service-DSC 502 remains unable to ascertain whether or not the PD printer 1000 that is the connected device supports Direct Print Service-Printer.

Accordingly, in the succeeding step S952, the Default Setting Service-Printer 812 issues a SendObjectInfo Operation and the SendObject Operation that follows thereon, which notifies the DSC 3012 of the fact that it supports Default Setting Service-Printer as well as of the supported content, and sends the default setting supported notification script "DSS_DIS_B".

FIG. 10 is diagram showing an example of the default setting supported notification script "DSS_DIS_B" transmitted in step S952. As with other scripts, each item is indicated by a tag, written in a format in which the value of the item is described between a start tag (<(character sequence>) and an end tag (</(character sequence)>).

SC1001 is a tag indicating the start of supported capabilities description.

SC1002 is a tag indicating the start of description of supported function options from a main UI.

SC1003 is a tag indicating the start of supported print mode description. In the present example, the tag indicates "color" for color printing and "monochrome" for black-and-white printing are supported as print modes.

SC1003 is a tag indicating the start of supported print mode description. In the present example, the tag indicates that "color" for color printing and "monochrome" for black-and-white printing are supported as print modes.

SC1004 is a tag indicating the start of description of supported function options from a sub UI.

SC1005 is a tag indicating the start of supported brightness adjustment description. In the present example, 7 levels of adjustment ranging from "−3" to "+3" are supported as brightness adjustments.

SC1006 is a tag indicating the start of supported level adjustment description. In the present example, three types of level adjustment are supported: "auto", for automatic adjustment, "off", in which there is no adjustment, and "on", in which adjustment is performed.

SC1007 is a tag indicating the start of supported face brightness correction description. In the present example, three types of face brightness correction are supported: "auto", for automatic correction, "off", in which there is no correction, and "on", in which correction is performed.

SC1008 is a tag indicating the start of supported red-eye reduction description. In the present example, three types of red-eye reduction are supported: "auto", for automatic reduction, "off", in which there is no reduction, and "on", in which reduction is performed.

SC1009 is a tag indicating the start of description of supported options from a detail UI.

SC1010 is a tag indicating the start of supported contrast adjustment description. In the present example, 7 levels of adjustment ranging from "−3" to "+3" are supported as contrast adjustments.

SC1011 is a tag indicating the start of supported saturation adjustment description. In the present example, 7 levels of adjustment ranging from "−3" to "+3" are supported as saturation adjustments.

SC1012 is a tag indicating the start of supported hue adjustment description. In the present example, 7 levels of adjustment ranging from "−3" to "+3" are supported as hue adjustments.

SC1013 is a tag indicating the start of supported color balance description.

SC1014 is a tag indicating the start of supported color balance red adjustment description. In the present example, 11 levels of adjustment ranging from "−5" to "+5" are supported as red color adjustments.

SC1015 is a tag indicating the start of supported color balance green adjustment description. In the present example, 11 levels of adjustment ranging from "−5" to "+5" are supported as green color adjustments.

SC1016 is a tag indicating the start of supported color balance blue adjustment description. In the present example, 11 levels of adjustment ranging from "−5" to "+5" are supported as blue color adjustments.

In step S952, when a SendObject Operation as a service configuration is received, the DSC 3012 Default Setting Service-DSC 802 knows that the PD printer 1000 that is the connected device supports Default Setting Service-Printer. The Default Setting Service-DSC 802 and the Default Setting Service-Printer 812 ascertaining that each supports Default Setting Service makes the later issuance of the Default Setting Service Operation possible.

Next, the process of step S906 is performed.

By receiving the SendObjectInfo Operation of step S906 as described above, the Direct Print Service-DSC 502 ascertains that the connected device PD printer 1000 supports Direct Print Service-Printer 512.

The Direct Print Service-DSC 502 and the Direct Print Service-Printer 512 ascertaining that each supports Direct Print Service makes the later issuance of the Default Setting Service Operation possible.

Next, the processes of steps S907-S908 are performed.

In step S908, as the response to the DPS_GetCapabilities Operation, print configuration information like that described with reference to FIG. 13 is transmitted, which causes a configuration screen (UI) to be constructed according to the Capability of both the Direct Print Service as well as the Default Setting Service reported in step S952 and to be displayed on the LCD 35. The UI is described in detail later.

The user, using the group of buttons and switches 34 on the DSC 3012, configures the print capabilities that the PD printer 1000 supports as well as the default settings as necessary, and selects an image to be printed (print image) from the captured images on the memory card.

Then, once the user selects and instructs the start of printing using the group of buttons and switches 34, the process proceeds to step S953 prior to the execution of step S909 that transmits a DPS_StartJob.

In step S953, the Default Setting Service-DSC 802 sends the default setting information script "DSS_SET" as a service configuration to the Default Setting Service-Printer 812 using the DSS_SetDefault Operation.

FIG. 11 is a diagram showing an example of the default setting information script "DSS_SET" transmitted in step S953. As with other scripts, each item is indicated by a tag, written in a format in which the value of the item is described between a start tag (<(character sequence>) and an end tag (</(character sequence)>).

The settings of each of the items SC1101-SC1116 correspond to those of SC1001-SC1016 shown in FIG. 10, respectively.

SC1101 is a tag indicating the start of default setting description.

SC1102 is a tag indicating the start of description of default setting options from a main UI.

SC1103 is a tag indicating the start of default print mode description. In the present example, the tag indicates that "color" for color printing is set as the print mode.

SC1104 is a tag indicating the start of description of default setting options from a sub UI.

SC1105 is a tag indicating the start of default brightness adjustment description. In the present example, the "+2" is set as the default brightness adjustment.

SC1106 is a tag indicating the start of default level adjustment description. In the present example, "auto" for automatic adjustment is set as the default level adjustment.

SC1107 is a tag indicating the start of default face brightness correction description. In the present example, "off", in which there is no correction, is set as the default face brightness correction.

SC1108 is a tag indicating the start of default red-eye reduction/removal description. In the present example, "off", in which there is no reduction, is set as the default red-eye reduction.

SC1109 is a tag indicating the start of description of default setting options from a detail UI.

SC1110 is a tag indicating the start of default contrast adjustment description. In the present example, "−2" is set as the default contrast adjustment.

SC1111 is a tag indicating the start of default saturation adjustment description. In the present example, "+2" is set as the default saturation adjustment.

SC1112 is a tag indicating the start of default hue adjustment description. In the present example, "+1" is set as the default hue adjustment.

SC1113 is a tag indicating the start of default color balance description.

SC1114 is a tag indicating the start of default color balance default red adjustment description. In the present example, "+2" is set as the default red color adjustment.

SC1115 is a tag indicating the start of default color balance default green adjustment description. In the present example, "+5" is set as the default green color adjustment.

SC1116 is a tag indicating the start of default color balance default blue adjustment description. In the present example, "−1" is set as the default blue color adjustment.

Next, step S909 is processed and the start of the printing process is reported to the Direct Print Service-Printer 812 by the DPS_StartJob Operation together with the print configuration information (FIG. 7) as a service configuration.

At this point, if "PrinterDependent" is the SC708 image correction setting value that is included in the print configuration information, then correction that conforms to the configuration at the Printer is specified. Therefore, print results are obtained that reflect the Default Setting Service DSS_SetDefault setting contents transmitted in step S953.

If "off" is described in the image correction configuration description tag of SC708, this means that Printer configuration is not to be carried out, and therefore the Default Setting Service DSS_SetDefault setting contents are invalid.

Thereafter, as with steps S610-S613 the printing process of steps S910-S913 are carried out. Once printing is completed the PD printer reports same by DPSS_NotifyDeviceStatus, and once more returns to the post-step S908 state to continue the process therefrom.

Thus, in the present embodiment, a default setting service that sets the default configuration of the PD printer separate from the photo-direct print service is used cooperatively therewith, which makes it possible to implement print adjustments and corrections that are not defined by the photo-direct print service standards while maintaining photo-direct print service connectivity.

It should be noted that, in the present embodiment, step S952, in which the PD printer 1000 notifies the DSC 3012 of information relating to the default setting service, is carried out between steps S905 and S906 that the standard DPS service carries out for the following reasons.

First, in the present embodiment, the Default Setting Service is set as an auxiliary service to the Direct Print Service. Depending on the status of the DSC 3012, there is the possibility of shifting to other protocols without shifting to Direct Print Service. Therefore, it is safer to report the default setting service information that is the auxiliary service after confirming that the DSC 3012 supports Direct Print Service-DSC (has DPS_DIS_A) through the process of step S905.

Second, after step S906, the Direct Print Service right of action shifts to the digital camera 3012. The digital camera 3012 with the right of action immediately executes the process up to step S908, enabling construction of the print configuration UI and display on the LCD 35. The user then selects print start through the print configuration UI and the process proceeds to step S909.

Assume hypothetically that at some point after step S906 and up to step S909, step S952 has been executed. In this case, there is a possibility that the DSC 3012 may be forced to reconstruct the print configuration UI or it may become necessary to cancel a job that instructs the start of printing in order to enable the user to carry out setting relating to the default setting service.

Alternatively, without canceling the job that already specifies the start of printing, construction of a print configuration UI that reflects the Default Setting Service may be carried out after the job is finished. In this case, however, the user is presented with a UI that is different from the first one, which is undesirable in terms of usability because this can confuse the user and because a user who wishes to use the default setting service must once again instruct the printing of the same image.

In addition, if in the print configuration information relating to an already print-specified job (FIG. 7) the SC708 image correction configuration item is set to "PrinterDependent" in conformity with the Printer configuration, a different problem arises. Specifically, on the PD printer 1000 side, the Default Setting Service is deemed to be valid, and thus there is a possibility of reflecting the setting content of the Default Setting Service at that point and processing (that is, outputting an image).

Thus, as described above, it is preferable that step S952, in which information relating to default setting services that the PD printer 1000 supports is reported to the DSC 3012, be executed at least prior to the shifting of the DPS right of action to the DSC 3012, specifically, prior to the execution of step S906.

It should be noted that, in the present embodiment, in step S952, the existence of the script "DPS_DIS_B" as well as the script itself are transmitted from the PD printer 1000 to the DSC 3012 by the SendObjectInfo Operation and the SendObject Operation. In other words, the function that reports that the PD printer 1000 supports Default Setting Service-Printer (Discovery function) and the function that reports the capabilities that the Default Setting Service-Printer supports (DSS_SendCapability) are combined in step S952.

Alternatively, these two functions may be implemented at different times. However, as described with reference to the timing of the execution of step S952, preferably, the execution of DSS_SendCapability should be carried out at least prior to the digital camera 3012 obtaining the print capability information and the construction of the print configuration UI in step S908.

In addition, although in the present embodiment step S951 is combined with step S901, it may be executed at the same time as any one of the processes of steps S901-S905. What is important is that the "DSS_DIS_A" information that indicates that the DSC 3012 can accommodate Default Setting Service-DSC be transmitted to the PD printer 1000 without affecting the procedure for the Direct Print Service that is the basic service.

For example, in step S905, information that is equivalent to "DSS_DIS_A" may be transmitted using an area that is not used by the Direct Print Service in the attribute information of the "DPS_DIS_A" used in Direct Print Service Discovery. Areas that can be used for such information transmission include, for example, the object date and time of creation area, the object date and time of revision area, the key word area, and so forth.

Next, a description is given of the print configuration UI that is constructed by the DSC 3012 and displayed on the LCD 35 in the present embodiment.

The print configuration UI of the present embodiment includes a UI for carrying out settings relating to the basic service Direct Print Service and a UI for carrying out settings relating to the Default Setting Service added in the present embodiment.

Figure 14:
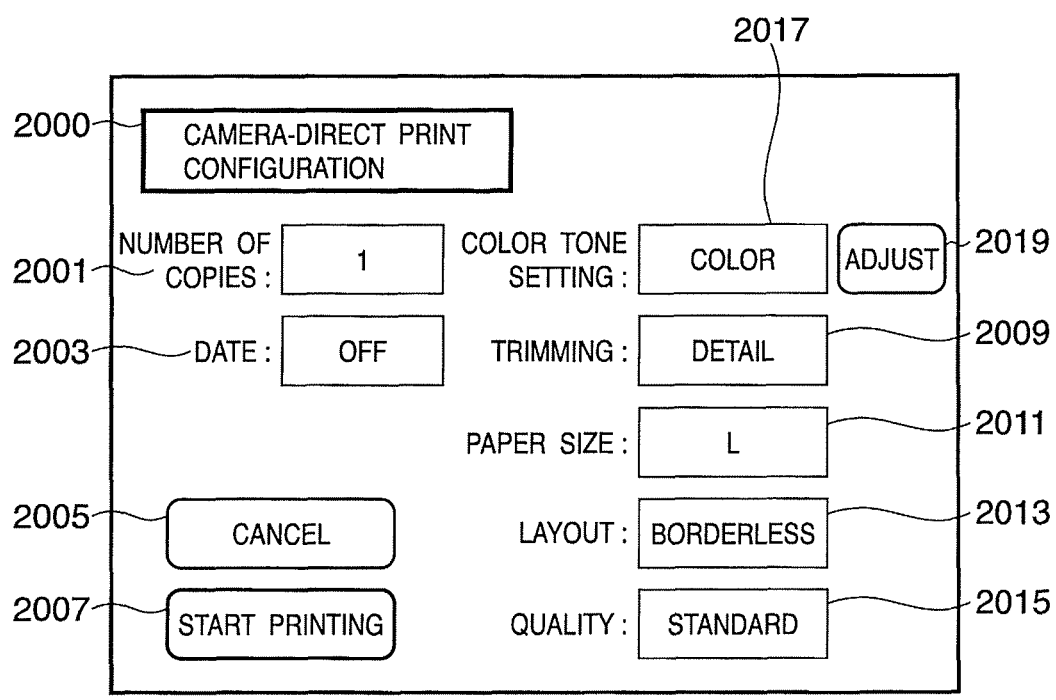
FIG. 14 is a diagram showing an example of a configuration screen (main UI) that the DSC according to the first embodiment of the present invention constructs and displays.
Figure 15:
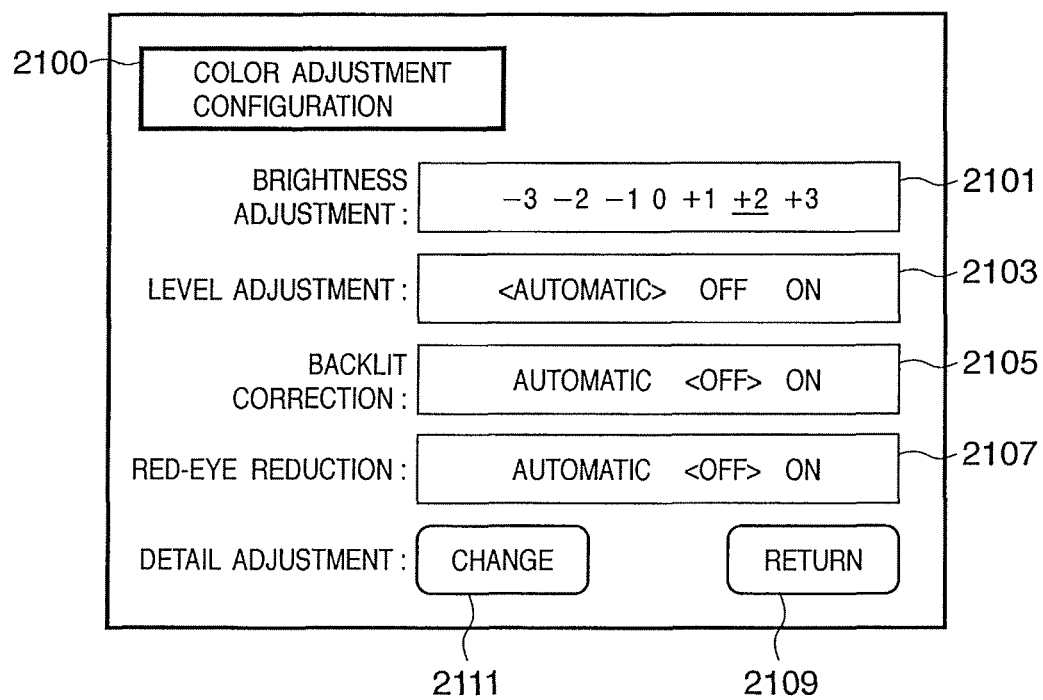
FIG. 15 is a diagram showing an example of a configuration screen (sub UI) that the DSC according to an embodiment of the present invention constructs and displays.
Figure 16:
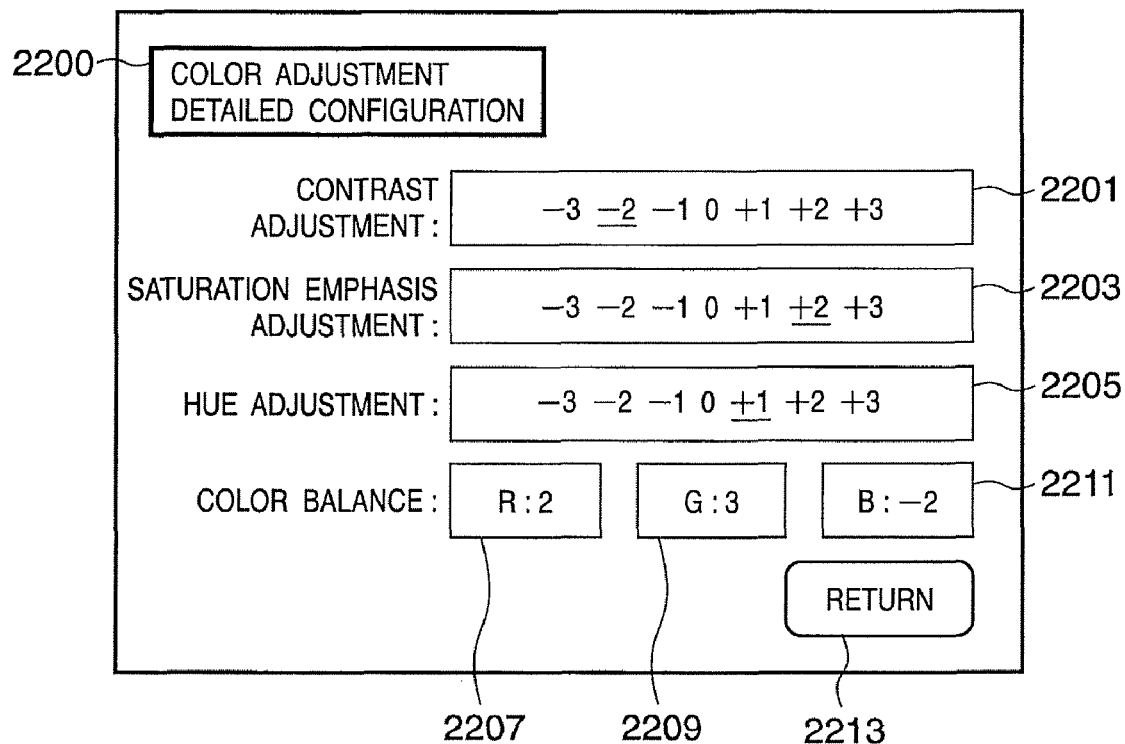
FIG. 16 is a diagram showing an example of a configuration screen (detail UI) that the DSC according to the first embodiment of the present invention constructs and displays.

FIG. 14, FIG. 15 and FIG. 16 are diagrams showing examples of configuration UI (configuration screens) constructed on the basis of script indicating configuration items that are supported by "Direct Print Service" (FIG. 13) and script indicating configuration items that are supported by "Default Setting Service" (FIG. 10).

In the DSC 3012 of the present embodiment, the configuration UI is a GUI having a layered structure, and is displayed on the LCD 35. Using the buttons and keys 35 of the DSC 3012, the user can set desired items to desired values.

FIG. 14 is a diagram showing an example of a screen mainly for carrying out setting of "Direct Print Service" (main UI). FIG. 15 is a diagram showing an example of a screen for carrying out setting of "Default Setting Service" (sub UI) that is called up from the main UI. FIG. 16 is a diagram showing an example of a screen for carrying out detailed setting of the "Default Setting Service" (detail UI).

In FIG. 14, a title 2000 indicates the type of configuration screen, and is provided so as to enable the user to ascertain that the UI is a camera-direct print configuration screen. Reference numerals 2001-2019 indicate buttons that the user uses in performing actual settings and the like. Using direction keys and execution keys of the DSC 3012, the user can select and depress desired buttons. Or, alternatively, where the LCD is equipped with a touch panel, the user can operate in the same manner as with actual buttons. The technique for implementing the operation of the GUI is not directly related to the present invention and moreover may be any commonly known technique, and therefore any further description thereof is omitted herein.

Reference numeral 2001 indicates a button that enables the user to select the number of copies, such that, for example, by pressing keys in a selected state, the number of copies to be printed can be specified. Reference numeral 2003 indicates a date print setting button, which toggles between ON and OFF. When ON, the date is printed. Reference numeral 2005 indicates a cancel button, which is used when ending camera-direct print setting without starting printing. Reference numeral 2007 indicates a print start button, for instructing the start of printing that reflects the setting contents of the configuration screen.

Reference numeral 2009 indicates a trimming setting button. By pressing this button, the screen shifts to a separate screen, not shown, that sets the details of the trimming frame. The user can adjust and set the trimming frame with this separate screen. Reference numeral 2011 indicates a paper size setting button, which currently specifies "L size". By for example putting this button in a selected state and operating the direction keys the paper size can be changed. Reference numeral 2013 indicates a layout setting button, with which either bordered or borderless printing can be specified. Reference numeral 2015 indicates a print quality setting button, by which the print quality can be changed using the same methods as for the paper size.

In the main UI, buttons 2001, 2009, 2011, 2013 and 2015 are settings relating to PrinterCapability based on the Direct Print Service, by which a UI having the items and menus based on the script file shown in FIG. 13 is constructed.

By contrast, a color tone setting button 2017 and an adjustment button 2019 are settings based on the Default Setting Service, and are constructed on the basis of the script file shown in FIG. 10.

The color tone setting button 2017 is a button for carrying out setting of the color tone. By for example putting the button in a selected state and operating the direction keys, the setting value can be changed. Specifically, it is possible to select either "color" or "monochrome" of the options of the <PrintModes> of SC1003 shown in FIG. 10. It should be noted that it is not necessary to use in the UI the very menu described in the script file, with "color"="color" and "monochrome"="black-and-white" as displayed in FIG. 14. Alternatively, the DSC 3012 may carry out processing in such a way as to change expressions as necessary, make only a portion of the menu selectable and so on when constructing the UI.

The adjustment button 2019 is a button for shifting the screen to a sub UI for carrying out color tone adjustment, constructed on the basis of the existence of <subUIs> in the script shown in FIG. 10. When the adjustment button 2019 is pressed, the DSC 3012 shows the sub UI shown in FIG. 15 in place of the main UI on the LCD 35.

The sub UI shown in FIG. 15 is constructed by the DSC 3012 based on the menu and items described in the range enclosed within the sub UI tags (post-SC1005 <subUIs>-</subUIs>) in the script described in FIG. 10.

Title 2100 indicates the type of configuration screen, and is provided in order to enable the user to ascertain that this is a configuration screen relating to color adjustment. Brightness adjustment 2101 is constructed as a menu of set values −3 to +3 described in the <brightness> of SC1005 shown in FIG. 10. The user can carry out setting by, for example, putting this item in a selected state using the up and down arrow keys and by, for example, operating the left and right direction keys and putting a desired value in a selected state.

Similarly, level adjustment 2103, backlit correction 2105 and red-eye reduction item 2107 configuration items correspond to the SC1006<levelAdjusts>, SC1007<faceBrighters>, and SC1008<redEyeRemovals>, respectively, of the script shown in FIG. 10. The user moves a cursor by using the vertical and horizontal keys and carries out selection. "Return" button 2109 is a button for returning to the camera-direct printing configuration screen (the main UI) shown in FIG. 14 when setting at the sub UI is completed. The detail adjustment button 2111 is a button for shifting to the color adjustment detail configuration screen shown in FIG. 16. When the detail adjustment button 2111 is pressed, the DSC 3012 shows the sub UI shown in FIG. 15 in place of the main UI on the LCD 35.

The detail UI shown in FIG. 16 is constructed by the DSC 3012 based on the menu and items described in the range enclosed within the detail UI tag (post-SC1009 <detailUIs>-</detailUIs>) in the script described in FIG. 10.

Title 2200 indicates the type of configuration screen, and is provided in order to enable the user to ascertain that this is a detail configuration screen relating to color adjustment. Contrast adjustment 2201 is an item for carrying out settings relating to contrast adjustment, and is constructed as a menu of set values −3 to +3 described in the <contrast> of SC1010 shown in FIG. 10. The user can carry out setting by, for example, putting this item in a selected state using the up and down arrow keys and by, for example, operating the left and right direction keys and putting a desired value in a selected state.

Similarly, saturation emphasis adjustment 2203 and color tone adjustment 2205 configuration items correspond to the SC1011<saturations> and SC1012<hues>, respectively, of the script shown in FIG. 10. Color balance adjustment buttons 2207, 2209 and 2211 are setting buttons for setting the SC1014<reds>, SC1015<greens> and SC1016<blues>, respectively, that are the details of the SC1013<colorBalances> of the script shown in FIG. 10. The button is selected and, for example, by operating the up and down arrow keys, can be set anywhere between −5 and +5. "Return" button 2213 is a button for returning to the color configuration screen (the sub UI) shown in FIG. 15 when setting at the detail UI is completed.

Thus, as described above, in the present embodiment the various configuration screens (UI) that the DSC 3012 constructs have a layered structure. The main UI that is displayed first contains configuration items relating to the Direct Photo Print Service that is the basic service. As for the configuration items relating to the Default Setting Service that is an auxiliary service, the UI is constructed so that the configuration items that are enclosed within the <mainUIs> tags are included in the top layer (here, the main UI) in accordance with the specifications in the script shown in FIG. 10. Similarly, the DSC 3012 constructs the UI so that the configuration items enclosed within the <subUIs> tags are contained within a middle layer that is called up from the top layer, and the configuration items enclosed within the <detailUIs> tags are contained within a bottom layer that is called up from the middle layer.

With such a construction, the user need go through layers of configuration screens only when he or she wishes to carry out more detailed settings. Most ordinary users, for whom the default settings are sufficient, can carry out the minimum required settings using the top configuration screen that is displayed first. Users who wish to carry out more detailed settings can do so by shifting to the lower configuration screens.

It should be noted that the present embodiment involves an example in which the configuration screens are constructed in layers in accordance with the <mainUIs>, <subUIs> and <detailUIs> that specify setting layers. However, the DSC 3012 need not always construct configuration screens exactly in accordance with the layered structure specified in the script.

However, by adopting the layered structure according to the specifications of the script, effects like those described below can be achieved.

The top (main UI) camera-direct print configuration screen (FIG. 14) is constructed based on the items that are described in the script shown in FIG. 13 that indicate the capabilities of the printer with respect to the photo-direct printing service (DPS). The main UI that is displayed first is a screen for the purpose of setting the main settings that have the greatest impact on the printing results. At the same time, in addition to these main settings, the main UI also includes configuration items specified by the top layer from among configuration items described in the script shown in FIG. 10 that indicates the capabilities of the printer with respect to the default setting service (Default Setting Service), in other words, items that correspond to the <PrintMode> of SC1003. Where settings items that have a large effect on the printing results, such as color printing or monochrome printing, are present among the default setting service configuration items, usability is improved by being able to set these at the main UI just like Direct Print Service settings, and moreover, has the effect of preventing unintended printing results.

In addition, the adjustment button 2019 for shifting to a UI for carrying out setting of the DSS that is a separate service is provided on the UI for carrying out setting of the DPS. With a digital camera display device, in which the display size is generally small, it is difficult to display many items on a single screen. At the same time, if the screen is configured so as to scroll, then setting values for items that go off the screen cannot be seen. Using a layered structure in which configuration items of similar levels are grouped together as in the configuration screen configuration of the present embodiment provides the effect of making setting easier for the user.

The UI configuration of the present invention has a configuration like that of the adjust button 2019 of FIG. 14, which shifts from the configuration screen for mainly the DPS settings and the print start instruction to the configuration screen of mainly the DSS settings of FIG. 15. In addition, it has a configuration like that of the adjust button 2111 (detail adjustment button) of FIG. 15, which shifts from the configuration screen for mainly the DSS settings to the configuration screen for mainly the DPS settings. As a result, when the user carries out Default Setting Service-related setting, printing always starts only after returning to the DPS main configuration screen, which enables printing always to start in a state in which the DSS settings have been confirmed. In other words, the user carries out "print start" after "DSS setting" is completed.

In the present embodiment, the "DSS_set" of step S953 and the "DPS_StartJob" of step S909 shown in FIG. 9 are both processes that the DSC 3012 performs. However, it is preferable that step S953 be executed prior to step S909, because, where DSS setting has been performed, it is possible for "print start" to be ordered after those DSS settings have been confirmed by configuring the UI as in the present embodiment.

Assume hypothetically an arrangement in which there is no structure for shifting between configuration screens as in the present embodiment, with "DPS setting" and "DSS setting" set completely independently and no structure for shifting between the two UI. In that case, it would be difficult to ensure that the "DSS_set" of step S953 shown in FIG. 9 is always executed prior to the "DPS_StartJob" of step S909, doing so would burden the user, and there is a strong possibility that it would give the user a sense of incongruity in the operation.

For example, during print start a warning would be necessary, such as "Is DSS setting finished?" or "Start printing after completing DSS setting," giving the user a feeling of incongruity in the operation. By contrast, providing for a regular shift between the "DPS setting" screen and the "DSS setting" screen as in the present embodiment neither burdens the user nor gives the user a feeling of incongruity in the operation, and enables the order of transmission "DSS_set" first followed by "DPS_StartJob" to be securely confirmed.

It should be noted that the present embodiment only describes an arrangement in which the shift to the configuration screen relating to DSS (FIG. 15, FIG. 16) assumes that the configuration screen relating to DPS (FIG. 14) is the starting point. Alternatively, however, simply by enabling input of a print start instruction after setting relating to DSS is completed, a configuration that enables shifting to the configuration screen for DSS-related settings from someplace other than the DPS-related configuration screen may be used.

Even so, since settings relating to DPS are the basic settings relating to direct printing, a configuration that shifts from a screen for performing DPS-related settings to a screen for performing DSS-related settings as in the present embodiment is preferable because it provides the user with a good sense of operation without a feeling of incongruity. Moreover, even where the user does not change the "DSS setting", operating from a "DPS setting" screen having a structure for shifting to the "DSS setting" screen enables the user to determine that he or she intentionally did not change the "DSS setting", which is even more preferable.

At the same time, in an arrangement that does not use DSS, a script file like that shown in FIG. 10 that shows the settings items of the printer that the DSS provides is not transmitted from the PD printer 1000 to the DSC 3012.

Figure 17:
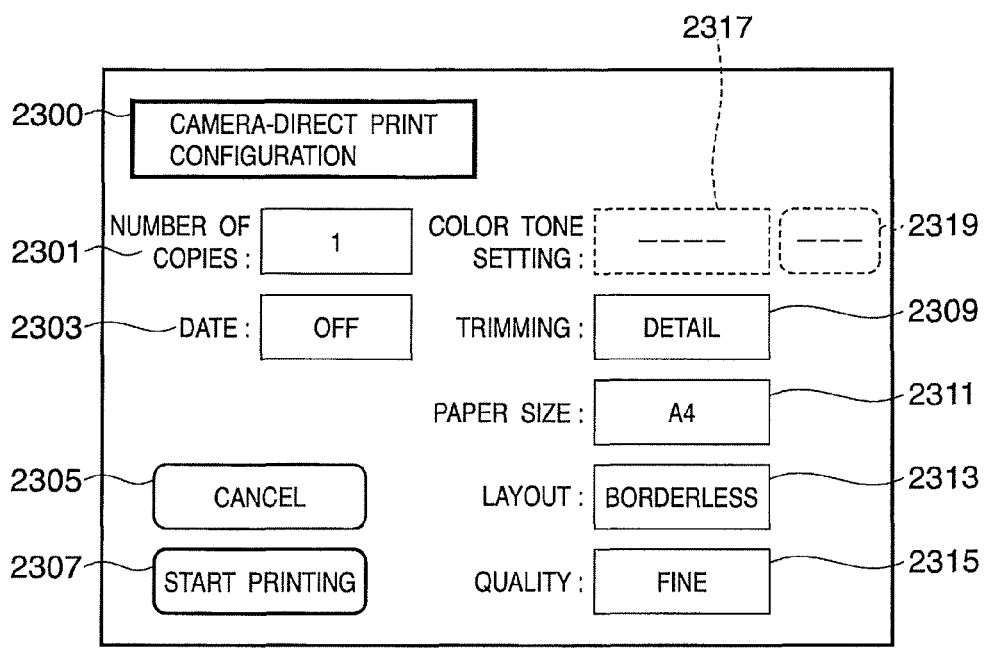
FIG. 17 is a diagram showing an example of a configuration screen (main UI) that the DSC according to the first embodiment of the present invention constructs and displays when a default setting service is not used.

In this case, at the main UI, as shown for example in FIG. 17, the configuration items relating to DSS are rendered invalid (here, they are not displayed). However, when those configuration items relating to DSS that should be included in the main UI are confirmed, it is sufficient to display only the item name as shown in FIG. 17. Making it impossible to shift to the configuration screen relating to DSS when not using DSS as described above eliminates operation of items that cannot be changed or the user specifying a mistaken change, and has the effect of improving the user's sense of operation.

It should be noted that although in the example described above a button for shifting between configuration screens is included in the GUI that is displayed on the LCD 35, alternatively a button that the DSC has as an operation panel may be used. In that case, the button may be a dedicated button used solely for shifting screens or it may be a button that is used jointly for other functions as well. In other words, in each configuration screen, the functions of the buttons may be enabled as functions for the purpose of shifting between screens.

Further, although an arrangement is described in which a "print start" button 2007 for instructing a print command is provided on the configuration screen relating to DPS, it is not necessary to have a configuration in which the settings relating to DPS and print instruction are performed from the same screen. Thus, for example, like the buttons for shifting between configuration screens described above, the button that provides the print instruction may be an actual button that the DSC has instead of in the GUI, or it may be included in the configuration screen on top of the configuration screen relating to DPS. However, as described above, where DSS setting has been carried out it is necessary to have a structure in which a print start instruction cannot be carried out until after that setting is completed.

In the present embodiment, the construction of the UI that the DSC 3012 displays is carried out on the basis of scripts relating to DPS and DSS that are transmitted from the PD printer 1000. Depending on the relations between the items contained in the script and the type of DSC 3012, it is possible that there are items and menus that cannot be displayed on the UI. In that case, although it does not matter how such items are processed, it is preferable that those items that can be displayed are displayed to the extent possible. Conversely, where there are fewer items and menus provided by the script (setting range) than the configuration items and menus with which the DSC is already equipped, it is even more preferable that the UI be constructed according to the script because doing so is easier on the user, although the present invention is not limited thereto.

Thus, as described above, according to the present embodiment, in a direct print service that is supported as standard, using a discovery procedure that confirms the capabilities of the connected device enables the presence of a separate service to be confirmed. As a result, if the connected device can utilize the separate service, it is possible to carry out a direct-printing process that reflects the separate service without affecting the procedures of the direct print service supported as standard.

In addition, where the connected device does not have a separate service, it is still possible to execute a direct-printing process that has been supported as standard up to now, and thus there is no possibility of causing an abnormal operation.

In addition, usability is good because settings relating to two services can be performed on the camera side.

Second Embodiment

Next, a description is given of a second embodiment of the present invention.

In the present embodiment, the script file relating to DSS that is transmitted from the PD printer 1000 to the DSC 3012 is the same as that of the first embodiment except for the operation of constructing the UI at the DSC 3012, and therefore a description of the same structures and operations is omitted.

FIG. 12 is a diagram showing an example of the "DSS_DIS_B" default setting supported notification script transmitted in step S952 shown in FIG. 9 from the PD printer 1000 that is one example of an image-printing apparatus according to the present embodiment.

SC1201 is a tag showing the start of a first supported function description. In the present embodiment, this tag can be used multiple times, enabling the relations between the respective print modes options and the other adjustments and corrections to be defined.

SC1202 is a tag showing the start of description of supported function options available in the main UI.

SC1203 is a tag showing the start of supported print mode description. In the present example, this tag indicates that "color", for color printing, is supported as the print mode. In other words, this tag indicates that the corrections and adjustments of from SC1204 to SC1216 are adjustments and corrections relating to this "color".

The content and operation of tags SC1204-SC1213 are the same as those of SC1004-SC1013 shown in FIG. 10, and therefore descriptions thereof are omitted.

SC1214-SC1216 are tags indicating the start of descriptions of supported red, green and blue color balance adjustments, respectively. In the present example, the tags indicate that 7 levels of adjustment ranging from "−3" to "+3" are supported.

SC1221 is a tag indicating the start of a second supported capabilities description.

SC1222 is a tag showing the start of description of supported function options that are available in the main UI.

SC1223 is a tag showing the start of supported print mode description. In the present example, this tag indicates that "monochrome", for black-and-white printing, is supported as the print mode. In other words, this tag indicates that the corrections and adjustments of from SC1224 to SC1228 are adjustments and corrections relating to this "monochrome".

The content and operation of tags SC1224 and SC1226-SC1228 are the same as those of SC1204 and SC1206-SC120S, and therefore descriptions thereof are omitted.

SC1225 indicates that, in the present example, 5 levels of adjustment ranging from "−2" to "+2" are supported as brightness adjustments.

In the second supported function configuration group, there are no descriptions of supported function options in the detail UI corresponding to the SC1209-SC1216 of the first supported configuration group. This is because the second supported function consists of adjustments and corrections relating to monochrome printing, and functions relating to color tone adjustments can be considered superfluous.

Thus, as described above, in the present embodiment, a script file is used that uses a descriptive format that enables the supported adjustment items and adjustment range to be changed depending on whether the print mode is "color" or "monochrome".

Next, a description is given of what type of UI the DSC 30121, having received such a script file, constructs.

As can be seen from a comparison of the script files shown in FIGS. 10 and 12, SC1004-SC1016 and SC1204-SC1216 are the same, and therefore, when the <printModes> is "color", the options and menus are the same and there is no difference in the constructed UI.

Figure 18A:
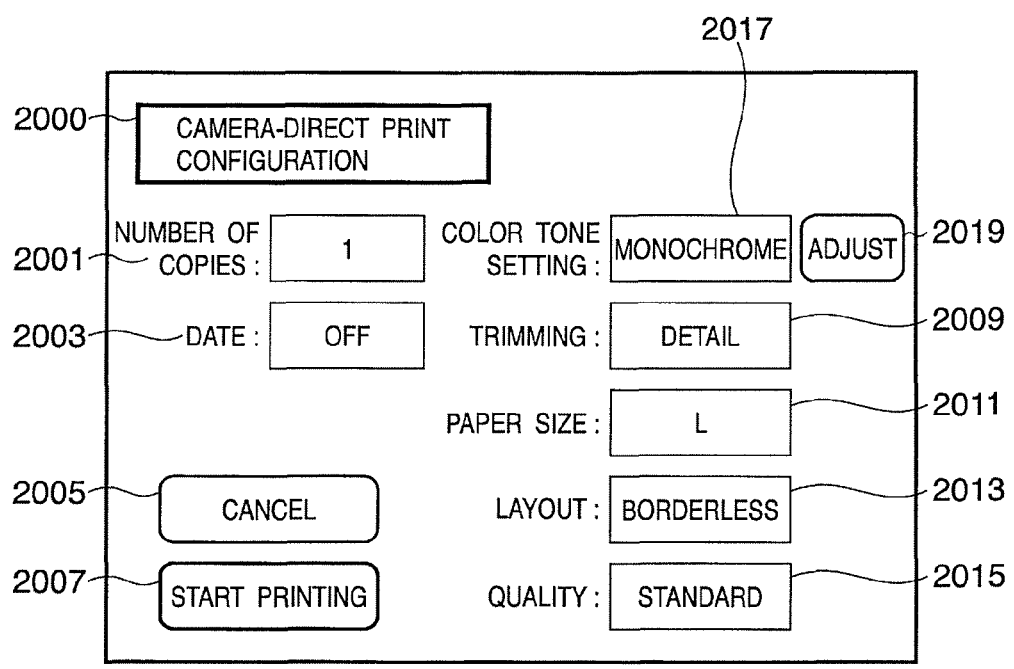
FIGS. 18A and 18B are diagrams showing examples of configuration screens (main UI and sub UI) that the DSC according to the second embodiment of the present invention constructs and displays.
Figure 18B:
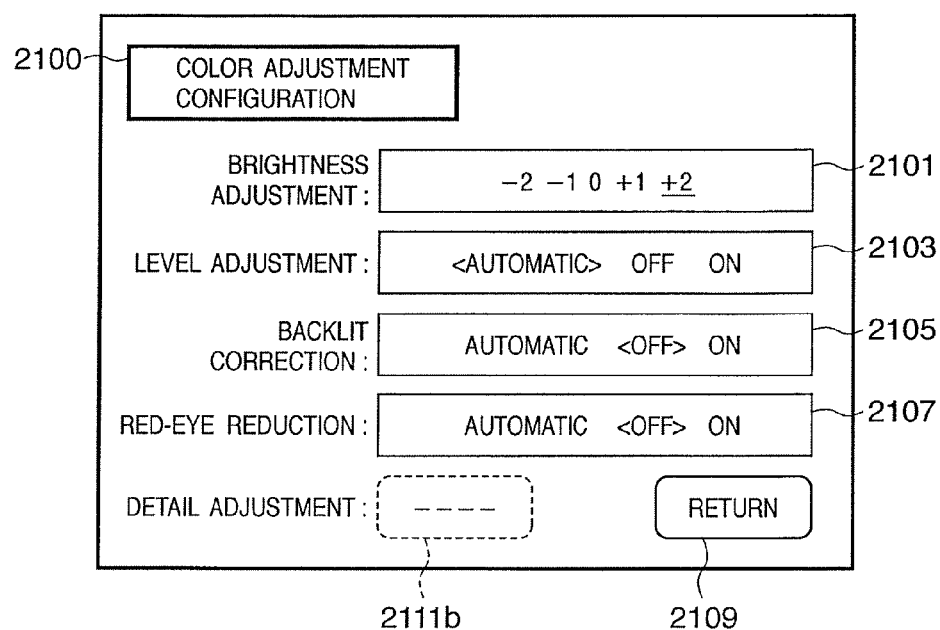

Accordingly, a description is given, using FIG. 18A and FIG. 18B, of the processing of a script in a case in which the <printModes>, which exists only in the script file shown in FIG. 12, is "monochrome".

Once a script file of the format shown in FIG. 12 relating to the DSS is received, the DSC 3012 constructs the UI so as to include in the main UI those items that are defined by the <mainUIs> that follows the <defaultSettingCapabilities> tag. Therefore, the "camera-direct print configuration screen" shown in FIG. 18A is the same as the one shown in FIG. 14 described in the first embodiment.

What is different, however, is that, in FIG. 18A, the user has operated the color tone setting button 2017 and set the print mode to "monochrome". In this state, if the adjustment button 2019 is pressed, the DSC 3012 constructs and displays the sub UI.

At this time, in the script shown in FIG. 12, a sub UI that changes according to the color tone setting, that is, the <printModes> value, is specified. As a result, the DSC 3012, based on the fact that the color tone setting is monochrome, constructs and displays the sub UI shown in FIG. 18B based on SC1224-SC1228.

As is clear from a comparison with the sub UI that is constructed and displayed in the color print mode (FIG. 15), in the sub UI for the monochrome print mode, the settable range of the brightness adjustment 2101b defined by the <brightness> tag is from −2 to +2. In addition, the button 2111b for shifting to the "detail adjustment configuration screen" is put into a non-selectable state (not displayed here).

This situation reflects the contents of settings SC1222-SC1228 when the <printModes> of the script file of the present embodiment (FIG. 12) is "monochrome". When the SC1223 <printModes> is "Monochrome" the SC1225 <brightnesses> in <subUIs> is −2 to +2. When the <PrintMode> is "Color", the SC1205 setting values are −3 to +3. Moreover, when the <printMode> is "Color", if the <detailUIs> described in SC1209 and thereafter is "Monochrome" there is no description. Reflecting this fact, the button 2111b for shifting to the detail configuration screen is rendered invalid.

Thus, as described above, when a shift to the sub UI is specified in a state in which the print mode is set to "monochrome" in the camera-direct print configuration screen, a UI is constructed using the description for the monochrome printing mode.

Thus, as described above, according to the present embodiment, where there are items whose supported function changes depending on the setting values, a UI can be constructed that can set supported functions for the actual setting values, and as a result have the effect of making it possible to prevent the user from selecting a function that is actually not supported.

Other Embodiments

In the embodiments described above, the description focuses on the Default Setting Service that enables the printer configuration to be utilized as an example of a separate service that implements a capability that is not supported as standard in cooperation with a service that is supported as standard (Direct Print Service).

However, the nature if the present invention is the carrying out of discovery of another service (an auxiliary service) that implements a cooperative function that is not defined by a standard service within the period of the discovery procedure if the service that is supported as standard (the standard service), and preferably using that procedure. Therefore, the standard service or auxiliary service in question may be of a type that implements other functions.

For example, where the standard service is a photo-direct print service as in the present embodiments and the PD printer has two or more paper supply ports, the auxiliary service may be one that transmits the number of paper supply ports and enables from which paper supply port the paper is to be supplied in the printing process to be specified. In addition, the auxiliary service may be a service that transmits support information of an auxiliary service that supports a sophisticated layout function that is not supported by the standard service and enables printing using the sophisticated layout that the auxiliary service supports. In addition, the auxiliary service may be a service that transmits double-sided printing function support information and enables double-sided printing to be used.

In the embodiments described above, where the PD printer and the DSC each recognize that the other supports the same auxiliary service, the system may be configured so that the user is notified of that fact.

For example, in the embodiments described above, at the point when the response to step S951 is received, the PD printer can ascertain whether or not the DSC supports the auxiliary service. In this case, for example, it is preferable that the PD printer notify the user by some method that a DSC that supports the auxiliary service is connected.

For example, a message may be displayed if there is a display device such as an LCD that is capable of displaying text on the body of the printer, or the state of the lighting of an LED or the like may be changed. Audio may be used as well. Particularly in a case in which there is a possibility that the configuration of the printer may be changed as in the default setting service described above, communicating that fact to the user has the advantage of enabling the user to understand the operating status of the system adequately.

In addition, where it is confirmed that the printer configuration contents actually do change (that is, DSS_SET is transmitted from the DSC to the printer, and further, the print settings of the standard service accord priority to the printer configuration), communicating that fact offers the same advantage. In addition, if the printer has a display device capable of displaying text, displaying the contents of those configurations that have actually been changed allows more detailed information to be communicated to the user.

In addition, since the printing process immediately after the changing of the configuration from the DSC is performed after confirming the configuration contents using the LCD of the DSC, it can be assumed that the user himself or herself knows the configuration contents. However, where the configuration is changed without warning by other users, or as time passes or when using another DSC, the user can forget what sort of configuration the printer is currently in or the printer is in a state different from the one that the user remembers.

With such factors in mind, the system is configured so that it returns to the configuration with which the printer was shipped without using previously instituted DSS configuration changes when the printer power is turned OFF or when the USB connector that connects the DSC and the printer is disconnected, enabling user misunderstanding or confusion to be prevented.

As previously noted, in the embodiments described above an example in which "DSS" is the auxiliary service that provides a capability separate from the standardized capability but in cooperation with the "DPS" standard service is described. However, the present invention is also applicable to the use of other auxiliary services that are closely related to the printing process and can cooperate with the standard service.

In addition, in the present embodiments an example is described in which the DSC and the PD printer are connected via a USB interface and a USB cable. However, the present invention is not limited to this connection method, and thus other connections may be used, such as wireless connection (by Bluetooth® or wireless LAN, for example).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-43167, filed on Feb. 20, 2006, which is hereby incorporated by reference herein in its entirety.

What is claimed is:

1. An image-providing apparatus capable of communicating directly with an image-printing apparatus, comprising:
  a first transmission unit which transmits to the image-printing apparatus first information indicating that said image-providing apparatus supports a first printing service corresponding to a direct print service using a predetermined direct print protocol, wherein in a communication that complies with the predetermined direct print protocol, first capability information indicating capabilities of the first printing service can be transmitted;
  a second transmission unit which transmits to the image-printing apparatus second information indicating that said image-providing apparatus supports a second printing service that cooperates with the first printing service and provides image processing which is not provided by said first printing service, wherein the image processing provided by the second printing service includes image processing which is not included in the first capability information;
  a first reception unit which receives from the image-printing apparatus third information indicating that the image-printing apparatus supports the first printing service;
  a second reception unit which receives from the image-printing apparatus, before said first reception unit receives the third information, fourth information indicating that the image-printing apparatus supports the second printing service;
  a third transmission unit which transmits to the image-printing apparatus image processing configuration information based on the second printing service; and
  a fourth transmission unit which transmits to the image-printing apparatus, after transmission of the image processing configuration by said third transmission unit is completed, a print job describing a printing configuration based on the first printing service.

2. The image-providing apparatus according to claim 1, wherein a user interface screen is constructed in accordance with the third information and the fourth information to allow a user to set service configurations relating to the first printing service and the second printing service.

3. The image-providing apparatus according to claim 1, wherein said first transmission unit and said second transmission unit share a single message and transmit the first information and the second information simultaneously.

4. An image-printing apparatus capable of communicating directly with an image-providing apparatus, comprising:
  a first reception unit which receives from the image-providing apparatus first information indicating that the image-providing apparatus supports a first printing service corresponding to a direct print service using a predetermined direct print protocol, wherein in a communication that complies with the predetermined direct print protocol, first capability information indicating capabilities of the first printing service can be transmitted;
  a second reception unit which receives from the image-providing apparatus second information indicating that the image-providing apparatus supports a second printing service that cooperates with the first printing service and provides image processing which is not provided by the first printing service, wherein the image processing provided by the second printing service includes image processing which is not included in the first capability information;
  a first transmission unit which transmits to the image-providing apparatus third information indicating that said image-printing apparatus supports the first printing service;
  a second transmission unit which, prior to transmission of the third information by said first transmission unit, transmits to the image-providing apparatus fourth information indicating that said image-printing apparatus supports the second printing service;
  a third reception unit which receives from the image-providing apparatus image processing configuration information based on the second printing service; and
  a fourth reception unit which receives from the image-providing apparatus, after the image processing configuration information is received by said third reception unit, a print job describing a printing configuration based on the first printing service.

5. The image-printing apparatus according to claim 4, wherein information relating to a capability that is supported by the second printing service is included in the fourth information.

6. The image-printing apparatus according to claim 4, wherein said first reception unit and said second reception unit receive the first information and the second information from the same message from the image-providing apparatus.

7. The image-printing apparatus according to claim 4, further comprising a notification unit that gives notice when a configuration of said image-printing apparatus is changed by the second printing service.

8. An image-printing system formed by directly connecting an image-printing apparatus and an image-providing apparatus to each other, said image-providing apparatus comprising:
a first transmission unit which transmits to said image-printing apparatus first information indicating that said image-providing apparatus supports a first printing service corresponding to a direct print service using a predetermined direct print protocol, wherein in a communication that complies with the predetermined direct print protocol, first capability information indicating capabilities of the first printing service can be transmitted;
a second transmission unit which transmits to said image-printing apparatus second information indicating that said image-providing apparatus supports a second printing service that cooperates with the first printing service and provides image processing which is not provided by said first printing service, wherein the image processing provided by the second printing service includes image processing which is not included in the first capability information;
a first reception unit which receives from said image-printing apparatus third information indicating that said image-printing apparatus supports the first printing service;
a second reception unit which receives from the image-printing apparatus, before said first reception unit receives the third information, fourth information indicating that said image-printing apparatus supports the second printing service;
a third transmission unit which transmits to said image-printing apparatus image processing configuration information based on the second printing service; and
a fourth transmission unit which transmits to said image-printing apparatus, after transmission of the image processing configuration by said third transmission unit is completed, a print job describing a printing configuration based on the first printing service;

said image-printing apparatus comprising:
a third reception unit which receives the first information from said image-providing apparatus;
a fourth reception unit which receives the second information from said image-providing apparatus;
a fourth transmission unit which transmits the third information to said image-providing apparatus;
a fifth transmission unit for transmitting the fourth information prior to transmission of the third information by said fourth transmission unit;
a fifth reception unit which receives image processing configuration information based on the second printing service from said image-providing apparatus; and
a sixth reception unit which receives, after the image processing configuration information is received by said fifth reception unit, a print job describing a printing configuration based on the first printing service from said image-providing apparatus.

9. A control method for an image-providing apparatus capable of communicating directly with an image-printing apparatus, the method comprising:
a first transmission step which transmits to the image-printing apparatus first information indicating that the image-providing apparatus supports a first printing service corresponding to a direct print service using a predetermined direct print protocol, wherein in a communication that complies with the predetermined direct print protocol, first capability information indicating capabilities of the first printing service can be transmitted;
a second transmission step which transmits to the image-printing apparatus second information indicating that the image-providing apparatus supports a second printing service that cooperates with the first printing service and provides image processing which is not provided by the first printing service, wherein the image processing provided by the second printing service includes image processing which is not included in the first capability information;
a first reception step which receives from the image-printing apparatus third information indicating that the image-printing apparatus supports the first printing service;
a second reception step which receives from the image-printing apparatus, before the first reception unit receives the third information, fourth information indicating that the image-printing apparatus supports the second printing service;
a third transmission step which transmits to the image-printing apparatus image processing configuration information based on the second printing service; and
a fourth transmission step which transmits to the image-printing apparatus, after transmission of the image processing configuration information by the third transmission step is completed, a print job describing a printing configuration based on the first printing service.

10. A control method for an image-printing apparatus capable of communicating directly with an image-providing apparatus, the method comprising:
a first reception step which receives from the image-providing apparatus first information indicating that the image-providing apparatus supports a first printing service corresponding to a direct print service using a predetermined direct print protocol, wherein in a communication that complies with the predetermined direct print protocol, first capability information indicating capabilities of the first printing service can be transmitted;
a second reception step which receives from the image-providing apparatus second information indicating that the image-providing apparatus supports a second printing service that cooperates with the first printing service and provides image processing which is not provided by the first printing service, wherein the image processing provided by the second printing service includes image processing which is not included in the first capability information;

a first transmission step which transmits to the image-providing apparatus third information indicating that the image-printing apparatus supports the first printing service;

a second transmission step which, prior to transmission of the third information in said first transmission step, transmits to the image-providing apparatus fourth information indicating that the image-printing apparatus supports the second printing service;

a third reception step which receives from the image-providing apparatus image processing configuration information based on the second printing service; and a fourth reception step which receives from the image-providing apparatus, after the image processing configuration information is received in said third reception step, a print job describing a printing configuration based on the first printing service.

* * * * *